(12) United States Patent
Scavezze et al.

(10) Patent No.: US 9,311,718 B2
(45) Date of Patent: Apr. 12, 2016

(54) AUTOMATED CONTENT SCROLLING

(71) Applicant: MICROSOFT TECHNOLOGY LICENSING, LLC, Redmond, WA (US)

(72) Inventors: Michael J. Scavezze, Bellevue, WA (US); Adam G. Poulos, Sammamish, WA (US); Johnathan Robert Bevis, Redmond, WA (US); Nicholas Gervase Fajt, Seattle, WA (US); Cameron G. Brown, Bellevue, WA (US); Daniel J. McCulloch, Kirkland, WA (US); Jeremy Lee, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 14/161,693

(22) Filed: Jan. 23, 2014

(65) Prior Publication Data
US 2015/0206321 A1  Jul. 23, 2015

(51) Int. Cl.
*G06T 7/20* (2006.01)
*G02B 27/01* (2006.01)
(Continued)

(52) U.S. Cl.
CPC .............. *G06T 7/20* (2013.01); *G02B 27/0172* (2013.01); *G06F 3/012* (2013.01); *G06F 3/013* (2013.01);
(Continued)

(58) Field of Classification Search
CPC ............. G09G 3/16; G09G 5/24; G09G 5/14; G06T 19/006; G06T 15/005; G06T 11/203; G06T 1/20; G06T 11/60; G06T 19/00; G06T 11/00; G06K 15/02; G02B 27/0101; G02B 27/017; G02F 1/1523

USPC ........... 345/7, 8, 9, 48, 49, 76, 77, 84, 87, 88, 345/89, 90, 105, 418, 467, 471, 472, 501, 345/619, 629, 632, 633, 634, 636
See application file for complete search history.

(56) References Cited

U.S. PATENT DOCUMENTS

| | | |
|---|---|---|
| 5,831,594 A | 11/1998 | Tognazzini et al. |
| 6,603,491 B2 | 8/2003 | Lemelson et al. |

(Continued)

FOREIGN PATENT DOCUMENTS

CA          2773865 A1 * 10/2012

OTHER PUBLICATIONS

Kim, H. R., & Chan, P. K. (2005). "Implicit indicators for interesting web pages", pp. 1-8.*

(Continued)

*Primary Examiner* — Xiao Wu
*Assistant Examiner* — Sarah Lhymn
(74) *Attorney, Agent, or Firm* — Dan Choi; Judy Yee; Micky Minhas

(57) ABSTRACT

Methods for controlling the display of content as the content is being viewed by an end user of a head-mounted display device (HMD) are described. In some embodiments, an HMD may display the content using a virtual content reader for reading the content. The content may comprise text and/or images, such as text or images associated with an electronic book, an electronic magazine, a word processing document, a webpage, or an email. The virtual content reader may provide automated content scrolling based on a rate at which the end user reads a portion of the displayed content on the virtual content reader. In one embodiment, an HMD may combine automatic scrolling of content displayed on the virtual content reader with user controlled scrolling (e.g., via head tracking of the end user of the HMD).

20 Claims, 13 Drawing Sheets

(51) Int. Cl.

| | | |
|---|---|---|
| *G06F 3/0485* | (2013.01) | |
| *G09G 5/34* | (2006.01) | |
| *G06F 3/01* | (2006.01) | |
| *G09G 5/10* | (2006.01) | |
| *G06T 11/60* | (2006.01) | |
| *H04M 1/725* | (2006.01) | |

(52) U.S. Cl.
CPC .............. *G06F 3/0485* (2013.01); *G06T 11/60* (2013.01); *G09G 5/10* (2013.01); *G09G 5/34* (2013.01); *G02B 2027/0178* (2013.01); *G06F 2203/04804* (2013.01); *H04M 1/72569* (2013.01)

(56) References Cited

U.S. PATENT DOCUMENTS

| | | |
|---|---|---|
| 6,847,386 B2 | 1/2005 | Paleiov |
| 8,094,122 B2 | 1/2012 | Molander et al. |
| 8,232,962 B2 | 7/2012 | Buck |
| 2002/0180799 A1 | 12/2002 | Peck et al. |
| 2004/0255244 A1* | 12/2004 | Filner et al. ................... 715/517 |
| 2006/0256083 A1* | 11/2006 | Rosenberg ............. G06F 3/013 345/156 |
| 2008/0218434 A1* | 9/2008 | Kelly et al. ........................ 345/8 |
| 2011/0175925 A1* | 7/2011 | Kane et al. ..................... 345/589 |
| 2012/0127284 A1* | 5/2012 | Bar-Zeev et al. ................ 348/53 |
| 2012/0236025 A1 | 9/2012 | Jacobsen et al. |
| 2012/0256967 A1* | 10/2012 | Baldwin et al. ................ 345/684 |
| 2013/0021373 A1 | 1/2013 | Vaught et al. |
| 2013/0128364 A1 | 5/2013 | Wheeler et al. |
| 2013/0188032 A1 | 7/2013 | Vertegaal |
| 2013/0239068 A1 | 9/2013 | Krause |
| 2013/0325463 A1* | 12/2013 | Greenspan ............. G06F 3/013 704/235 |

OTHER PUBLICATIONS

"International Search Report and Written Opinion Issued in PCT Patent Application No. PCT/US2015/011670", Mailed Date: Mar. 31, 2015, 12 Pages.

Response to Written Opinion dated Jul. 8, 2015, PCT Patent Application No. PCT/US2015/011670.

Written Opinion of the Intellectual Preliminary Examining Authority dated Dec. 8, 2015, PCT Patent Application No. PCT/US2015/011670.

* cited by examiner

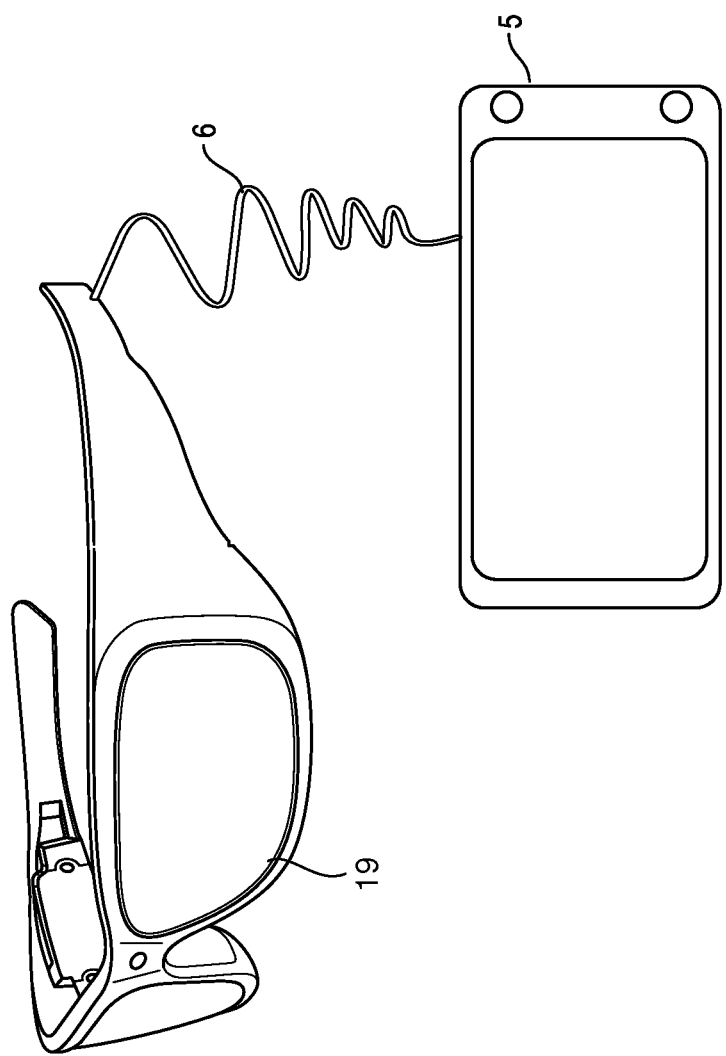

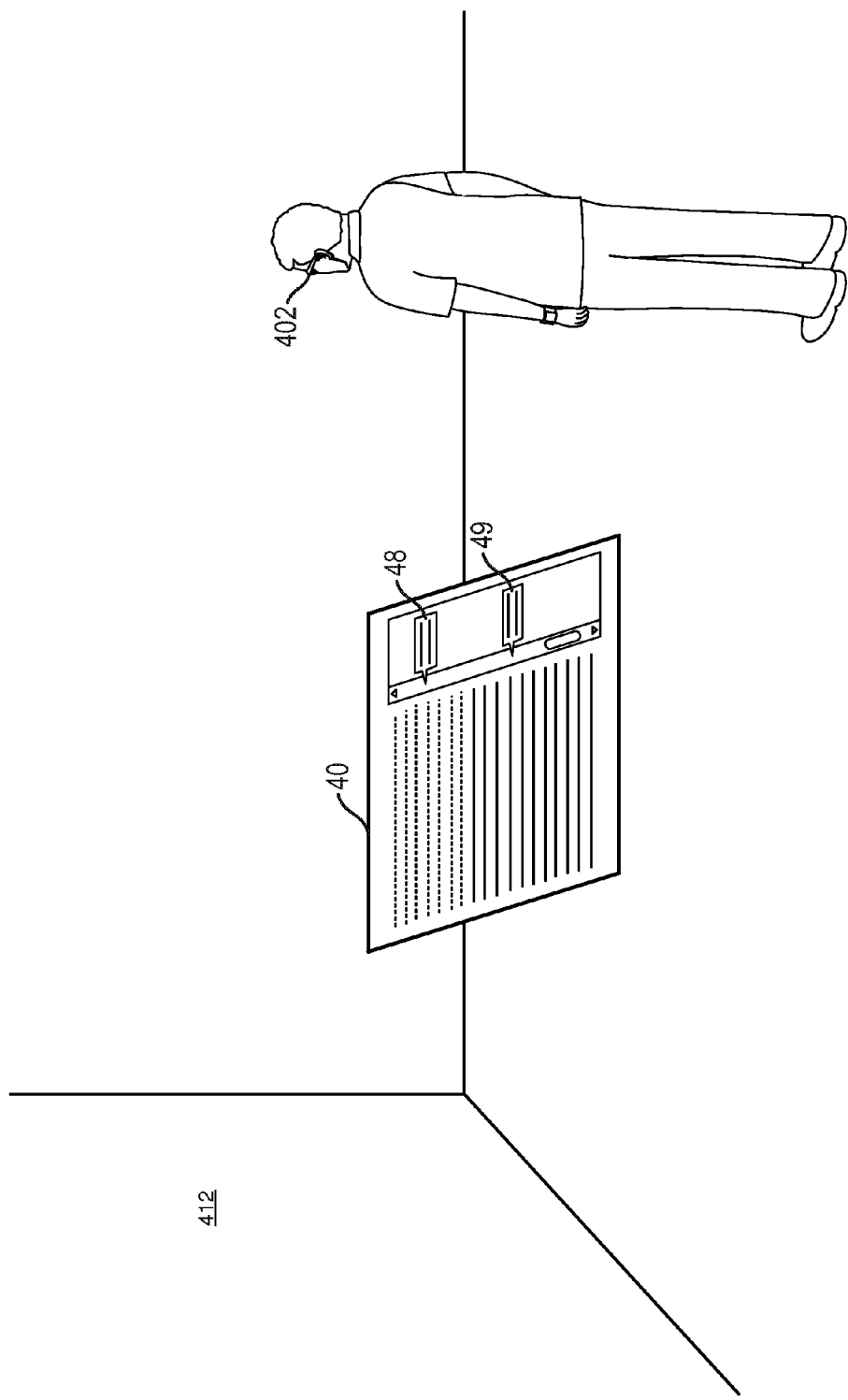

AUTOMATED CONTENT SCROLLING

BACKGROUND

Augmented reality (AR) relates to providing an augmented real-world environment where the perception of a real-world environment (or data representing a real-world environment) is augmented or modified with computer-generated virtual data. For example, data representing a real-world environment may be captured in real-time using sensory input devices such as a camera or microphone and augmented with computer-generated virtual data including virtual images and virtual sounds. The virtual data may also include information related to the real-world environment such as a text description associated with a real-world object in the real-world environment. The objects within an AR environment may include real objects (i.e., objects that exist within a particular real-world environment) and virtual objects (i.e., objects that do not exist within the particular real-world environment).

In order to realistically integrate virtual objects into an AR environment, an AR system typically performs several tasks including mapping and localization. Mapping relates to the process of generating a map of a real-world environment. Localization relates to the process of locating a particular point of view or pose relative to the map of the real-world environment. In some cases, an AR system may localize the pose of a mobile device moving within a real-world environment in real-time in order to determine the particular view associated with the mobile device that needs to be augmented as the mobile device moves within the real-world environment.

SUMMARY

Technology is described for controlling the display of content as the content is being viewed by an end user of a head-mounted display device (HMD). In some embodiments, an HMD may display the content using a virtual content reader for reading the content. The content may comprise text and/or images, such as text or images associated with an electronic book, an electronic magazine, a word processing document, a webpage, or an email. The virtual content reader may provide automated content scrolling based on a rate at which the end user reads a portion of the displayed content on the virtual content reader. In one embodiment, an HMD may combine automatic scrolling of content displayed on the virtual content reader with user controlled scrolling (e.g., via head tracking of the end user of the HMD).

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 2A depicts one embodiment of a mobile device in communication with a second mobile device.

FIG. 4C depicts one embodiment of an HMD worn by an end user viewing a virtual content reader within an augmented reality environment.

DETAILED DESCRIPTION

Figure 1:
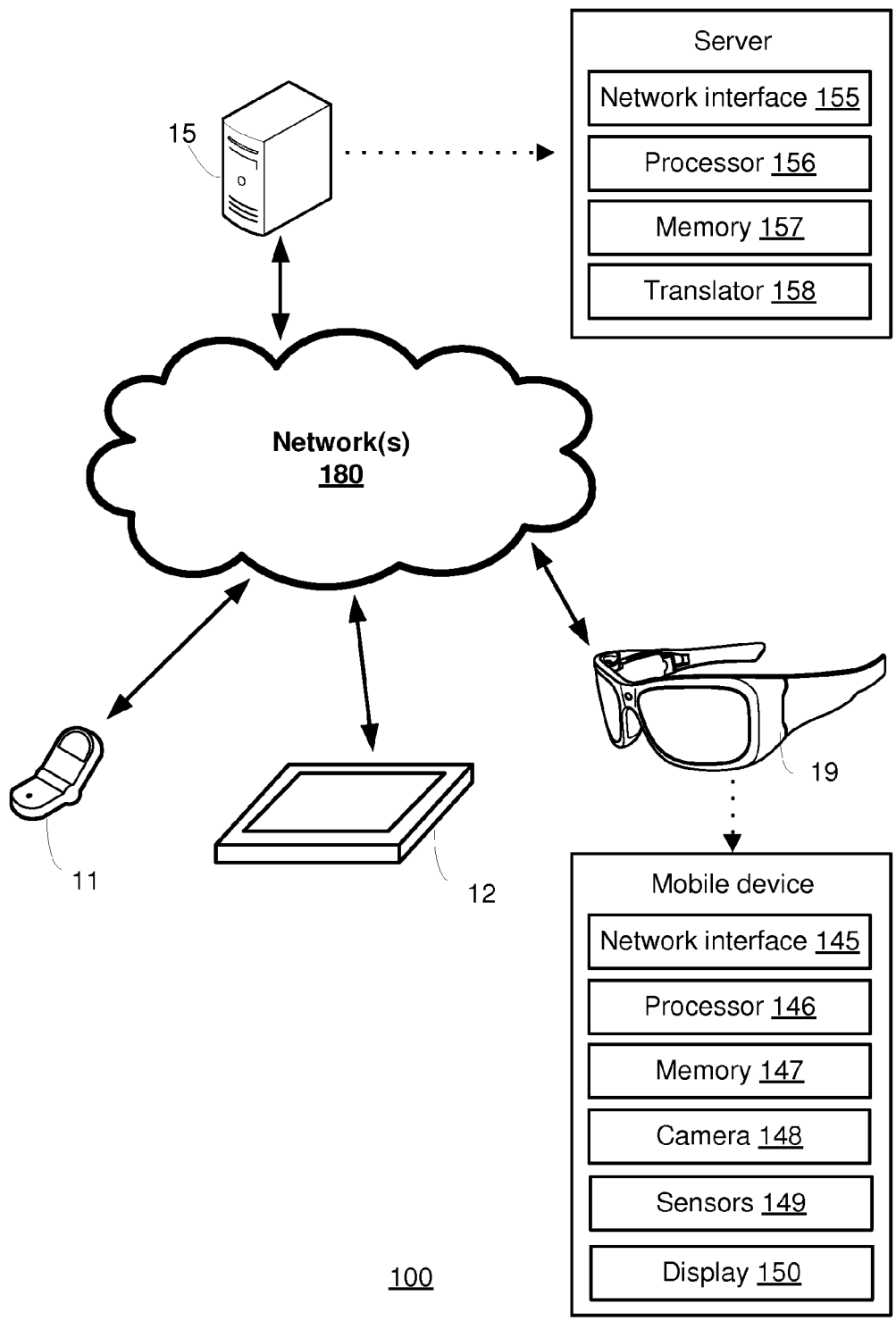
FIG. 1 is a block diagram of one embodiment of a networked computing environment in which the disclosed technology may be practiced.

Technology is described for controlling the display of content as the content is being viewed by an end user of a see-through display. The see-through display may comprise a head-mounted display device (HMD). In some embodiments, an HMD may display the content using a virtual content reader for reading the content. The content may comprise text and/or images, such as text or images associated with an electronic book, an electronic magazine, a word processing document, a webpage, or an email. The virtual content reader may provide automated content scrolling based on a rate at which the end user reads a portion of the displayed content on the virtual content reader. In one example, a scrolling rate for the displayed content may be set such that the end user of the HMD views a portion of the content being read within a first region of the virtual content reader (e.g., such that the portion of the content is positioned within a midsection of the virtual content reader). The scrolling rate may increase as the end user's reading pace increases and/or as the portion of the content being read gets closer to the bottom of the virtual content reader (e.g., the scrolling rate may increase as the end user reads content that is further away from a midsection of the virtual content reader).

In one embodiment, an HMD may combine automatic scrolling of content displayed on the virtual content reader with user controlled scrolling. The HMD may utilize eye tracking for determining which portion of the virtual content reader is being viewed by the end user and the rate at which the end user is reading a portion of the content displayed by the virtual content reader. The HMD may also utilize head tracking of the end user in order to enable the end user to manually control scrolling operations using the virtual content reader. In one example, the end user may gaze at a scrollbar associated with the virtual content reader and then use head movement to control the scrollbar and adjust the content being displayed on the virtual content reader. The scrollbar may be positioned adjacent to an area of the virtual content reader for displaying content (e.g., along one side of the area displaying content).

In one embodiment, the content to be displayed on the virtual content reader may be converted from a multiple column format into a single column format. Converting the content into a single column format may improve scrolling of the content and make it easier for an end user of the HMD to follow the content as it is being scrolled. In one example, an electronic document that has been formatted using three columns of text may be converted into a formatted document using only a single column of text. To further improve content tracking as the content is being automatically scrolled, as the end user reads particular portions of the displayed content, such as words, sentences, or paragraphs, a color of the previously read portions of the displayed content may be changed (e.g., the text may change from black to red or gray).

In one embodiment, an HMD may include a light sensing device for detecting a real-world lighting condition within an augmented reality environment (e.g., a degree of ambient lighting) and may adjust a font size and/or a contrast coloring for the displayed content on the virtual content reader. The adjustments to the font size and/or the contrast coloring may depend on both the lighting condition and a distance (or perceived distance within the augmented reality environment) of the virtual content reader from the end user of the HMD (e.g., if the end user is viewing a virtual content reader located on a wall that is 10 meters away from the end user). In one example, if the end user is in a dark room, then the font size may be increased. In another example, if the end user is in a bright environment (e.g., outside on a sunny day), then instead of displaying black text on a white background, the virtual content reader may display the content using blue text overlaying an orange background.

In some cases, an HMD may adjust a degree of transparency of the HMD based on a lighting condition within an augmented reality environment. For example, dimming a see-through display of the HMD when the HMD is in a bright environment may allow the use of black text on a white background. The HMD may include a display in which a degree of transparency, a degree of opacity, or other light transmission properties of the display may be adjusted (e.g., via the application of a voltage). In one example, when a particular voltage is applied to the display, the degree of transparency may be decreased causing a dimming of the see-through display. In one embodiment, the see-through display may include an electrochromic material. In another embodiment, the see-through display may include an electrically controlled film in which numerous microscopic particles are suspended (i.e., a suspended particular film).

In some embodiments, prior to displaying content on a virtual content reader, an HMD may acquire a set of bookmarks associated with the content. Each bookmark of the set of bookmarks may correspond with a location within the content. The location may be associated with a word, a sentence, a paragraph, or a section within the content. A first bookmark of the set of bookmarks may be associated with the last portion of the content that was viewed by the end user of the HMD (e.g., the last read sentence or paragraph or the last viewed image). A second bookmark of the set of bookmarks may be associated with the most frequently read section of the content that was read by the end user of the HMD (e.g., the most frequently read paragraph).

FIG. 1 is a block diagram of one embodiment of a networked computing environment 100 in which the disclosed technology may be practiced. Networked computing environment 100 includes a plurality of computing devices interconnected through one or more networks 180. The one or more networks 180 allow a particular computing device to connect to and communicate with another computing device. The depicted computing devices include mobile device 11, mobile device 12, mobile device 19, and server 15. In some embodiments, the plurality of computing devices may include other computing devices not shown. In some embodiments, the plurality of computing devices may include more than or less than the number of computing devices shown in FIG. 1. The one or more networks 180 may include a secure network such as an enterprise private network, an unsecure network such as a wireless open network, a local area network (LAN), a wide area network (WAN), and the Internet. Each network of the one or more networks 180 may include hubs, bridges, routers, switches, and wired transmission media such as a wired network or direct-wired connection.

Server 15, which may comprise a supplemental information server or an application server, may allow a client to download information (e.g., text, audio, image, and video files) from the server or to perform a search query related to particular information stored on the server. In general, a "server" may include a hardware device that acts as the host in a client-server relationship or a software process that shares a resource with or performs work for one or more clients. Communication between computing devices in a client-server relationship may be initiated by a client sending a request to the server asking for access to a particular resource or for particular work to be performed. The server may subsequently perform the actions requested and send a response back to the client.

One embodiment of server 15 includes a network interface 155, processor 156, memory 157, and translator 158, all in communication with each other. Network interface 155 allows server 15 to connect to one or more networks 180. Network interface 155 may include a wireless network interface, a modem, and/or a wired network interface. Processor 156 allows server 15 to execute computer readable instructions stored in memory 157 in order to perform processes discussed herein. Translator 158 may include mapping logic for translating a first file of a first file format into a corresponding second file of a second file format (i.e., the second file may be a translated version of the first file). Translator 158 may be configured using file mapping instructions that provide instructions for mapping files of a first file format (or portions thereof) into corresponding files of a second file format.

One embodiment of mobile device 19 includes a network interface 145, processor 146, memory 147, camera 148, sensors 149, and display 150, all in communication with each other. Network interface 145 allows mobile device 19 to connect to one or more networks 180. Network interface 145 may include a wireless network interface, a modem, and/or a wired network interface. Processor 146 allows mobile device 19 to execute computer readable instructions stored in memory 147 in order to perform processes discussed herein. Camera 148 may capture color images and/or depth images of an environment. The mobile device 19 may include outward facing cameras that capture images of the environment and inward facing cameras that capture images of the end user of the mobile device. Sensors 149 may generate motion and/or orientation information associated with mobile device 19. In some cases, sensors 149 may comprise an inertial measurement unit (IMU). Display 150 may display digital images and/or videos. Display 150 may comprise a see-through display.

In some embodiments, various components of mobile device 19 including the network interface 145, processor 146, memory 147, camera 148, and sensors 149 may be integrated on a single chip substrate. In one example, the network interface 145, processor 146, memory 147, camera 148, and sensors 149 may be integrated as a system on a chip (SOC). In other embodiments, the network interface 145, processor 146, memory 147, camera 148, and sensors 149 may be integrated within a single package.

In some embodiments, mobile device 19 may provide a natural user interface (NUI) by employing camera 148, sensors 149, and gesture recognition software running on processor 146. With a natural user interface, a person's body parts and movements may be detected, interpreted, and used to control various aspects of a computing application. In one example, a computing device utilizing a natural user interface may infer the intent of a person interacting with the computing device (e.g., that the end user has performed a particular gesture in order to control the computing device).

Networked computing environment 100 may provide a cloud computing environment for one or more computing devices. Cloud computing refers to Internet-based computing, wherein shared resources, software, and/or information are provided to one or more computing devices on-demand via the Internet (or other global network). The term "cloud" is used as a metaphor for the Internet, based on the cloud drawings used in computer networking diagrams to depict the Internet as an abstraction of the underlying infrastructure it represents.

In one example, mobile device 19 comprises a head-mounted display device (HMD) that provides an augmented reality environment or a mixed reality environment to an end user of the HMD. The HMD may comprise a video see-through and/or an optical see-through system. An optical see-through HMD worn by an end user may allow actual direct viewing of a real-world environment (e.g., via transparent lenses) and may, at the same time, project images of a virtual object into the visual field of the end user thereby augmenting the real-world environment perceived by the end user with the virtual object.

Utilizing an HMD, an end user may move around a real-world environment (e.g., a living room) wearing the HMD and perceive views of the real-world overlaid with images of virtual objects. The virtual objects may appear to maintain coherent spatial relationship with the real-world environment (i.e., as the end user turns their head or moves within the real-world environment, the images displayed to the end user will change such that the virtual objects appear to exist within the real-world environment as perceived by the end user). The virtual objects may also appear fixed with respect to the end user's point of view (e.g., a virtual menu that always appears in the top right corner of the end user's point of view regardless of how the end user turns their head or moves within the real-world environment). In one embodiment, environmental mapping of the real-world environment may be performed by server 15 (i.e., on the server side) while camera localization may be performed on mobile device 19 (i.e., on the client side). The virtual objects may include a text description associated with a real-world object.

In some embodiments, a mobile device, such as mobile device 19, may be in communication with a server in the cloud, such as server 15, and may provide to the server location information (e.g., the location of the mobile device via GPS coordinates) and/or image information (e.g., information regarding objects detected within a field of view of the mobile device) associated with the mobile device. In response, the server may transmit to the mobile device one or more virtual objects based upon the location information and/or image information provided to the server. In one embodiment, the mobile device 19 may specify a particular file format for receiving the one or more virtual objects and server 15 may transmit to the mobile device 19 the one or more virtual objects embodied within a file of the particular file format.

In some embodiments, a mobile device, such as mobile device 19, may comprise an HMD that provides an augmented reality environment including a virtual content reader. The virtual content reader may comprise a virtual object within the augmented reality environment in which content may be read by an end user of the HMD. In one embodiment, the virtual content reader may comprise a virtual object that appears fixed with respect to the end user's point of view (i.e., a head-locked virtual object). For example, the virtual content reader may appear in the top left corner of the end user's point of view regardless of how the end user turns their head. In another embodiment, the virtual content reader may comprise a virtual object that appears to maintain a coherent spatial relationship within the augmented reality environment (i.e., a world-locked virtual object). For example, as the end user turns their head or moves within the augmented reality environment, the images displayed to the end user on the HMD will change such that the virtual content reader appears to exist within the augmented reality environment at a particular location (e.g., on a wall).

In one embodiment, an HMD may determine an ambient lighting condition within an augmented reality environment and may adjust a font size and/or a contrast coloring for content displayed on a virtual content reader. The adjustments to the font size and/or the contrast coloring may depend on both the ambient lighting condition and a perceived distance of the virtual content reader from the end user of the HMD. In some cases, if the end user is in a dark environment (e.g., outside at night), then the font size may be increased if the virtual content reader is more than 2 meters away. In another example, if the end user is in a bright environment (e.g., outside on a sunny day), then instead of displaying black text on a white background, the virtual content reader may display the content using blue text overlaying an orange background if the virtual content reader is more than 2 feet away.

FIG. 2A depicts one embodiment of a mobile device 19 in communication with a second mobile device 5. Mobile device 19 may comprise a see-through HMD. As depicted, mobile device 19 communicates with mobile device 5 via a wired connection 6. However, the mobile device 19 may also communicate with mobile device 5 via a wireless connection. Mobile device 5 may be used by mobile device 19 in order to offload compute intensive processing tasks (e.g., the rendering of virtual objects) and to store virtual object information and other data that may be used to provide an augmented reality environment on mobile device 19. Mobile device 5 may also provide motion and/or orientation information associated with mobile device 5 to mobile device 19. In one example, the motion information may include a velocity or acceleration associated with the mobile device 5 and the orientation information may include Euler angles, which provide rotational information around a particular coordinate system or frame of reference. In some cases, mobile device 5 may include a motion and orientation sensor, such as an inertial measurement unit (IMU), in order to acquire motion and/or orientation information associated with mobile device 5.

Figure 2B:
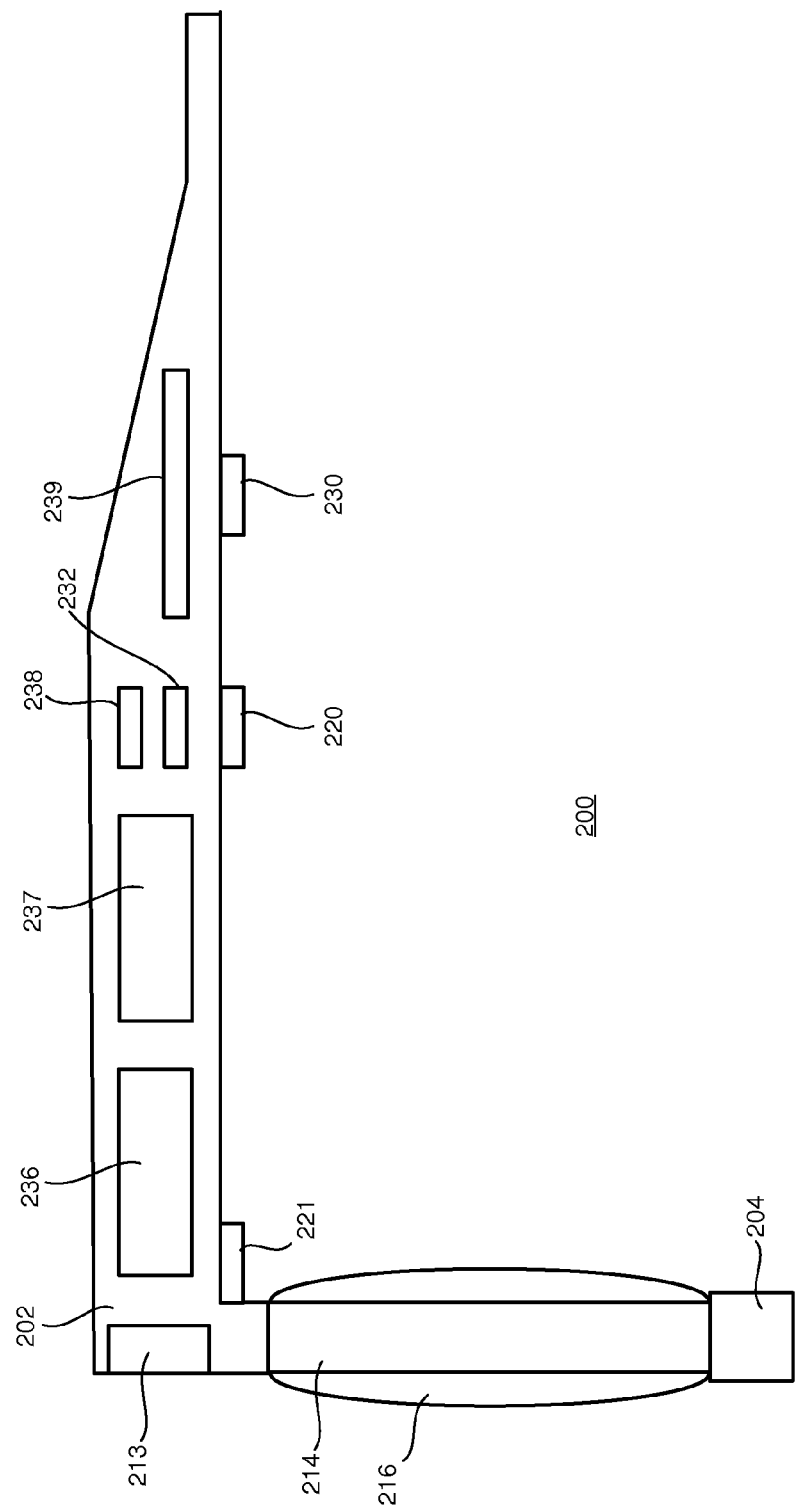
FIG. 2B depicts one embodiment of a portion of an HMD.

FIG. 2B depicts one embodiment of a portion of an HMD, such as mobile device 19 in FIG. 1. Only the right side of an HMD 200 is depicted. HMD 200 includes right temple 202, nose bridge 204, eye glass 216, and eye glass frame 214. Right temple 202 includes a capture device 213 (e.g., a front facing camera and/or microphone) in communication with processing unit 236. The capture device 213 may include one or more cameras for recording digital images and/or videos and may transmit the visual recordings to processing unit 236. The one or more cameras may capture color information, IR information, and/or depth information. The capture device 213 may also include one or more microphones for recording sounds and may transmit the audio recordings to processing unit 236.

Right temple 202 also includes biometric sensor 220, eye tracking system 221, ear phones 230, motion and orientation sensor 238, GPS receiver 232, power supply 239, and wireless interface 237, all in communication with processing unit 236. Biometric sensor 220 may include one or more electrodes for determining a pulse or heart rate associated with an end user of HMD 200 and a temperature sensor for determining a body temperature associated with the end user of HMD 200. In one embodiment, biometric sensor 220 includes a pulse rate measuring sensor which presses against the temple of the end user. Motion and orientation sensor 238 may include a three axis magnetometer, a three axis gyro, and/or a three axis accelerometer. In one embodiment, the motion and orientation sensor 238 may comprise an inertial measurement unit (IMU). The GPS receiver may determine a GPS location associated with HMD 200. Processing unit 236 may include one or more processors and a memory for storing computer readable instructions to be executed on the one or more processors. The memory may also store other types of data to be executed on the one or more processors.

In one embodiment, the eye tracking system 221 may include one or more inward facing cameras. In another embodiment, the eye tracking system 221 may comprise an eye tracking illumination source and an associated eye tracking image sensor. In one embodiment, the eye tracking illumination source may include one or more infrared (IR) emitters such as an infrared light emitting diode (LED) or a laser (e.g. VCSEL) emitting about a predetermined IR wavelength or a range of wavelengths. In some embodiments, the eye tracking sensor may include an IR camera or an IR position sensitive detector (PSD) for tracking glint positions. More information about eye tracking systems can be found in U.S. Pat. No. 7,401,920, entitled "Head Mounted Eye Tracking and Display System", issued Jul. 22, 2008, and U.S. patent application Ser. No. 13/245,700, entitled "Integrated Eye Tracking and Display System," filed Sep. 26, 2011, both of which are herein incorporated by reference.

In one embodiment, eye glass 216 may comprise a see-through display, whereby images generated by processing unit 236 may be projected and/or displayed on the see-through display. The capture device 213 may be calibrated such that a field of view captured by the capture device 213 corresponds with the field of view as seen by an end user of HMD 200. The ear phones 230 may be used to output sounds associated with the projected images of virtual objects. In some embodiments, HMD 200 may include two or more front facing cameras (e.g., one on each temple) in order to obtain depth from stereo information associated with the field of view captured by the front facing cameras. The two or more front facing cameras may also comprise 3D, IR, and/or RGB cameras. Depth information may also be acquired from a single camera utilizing depth from motion techniques. For example, two images may be acquired from the single camera associated with two different points in space at different points in time. Parallax calculations may then be performed given position information regarding the two different points in space.

In some embodiments, HMD 200 may perform gaze detection for each eye of an end user's eyes using gaze detection elements and a three-dimensional coordinate system in relation to one or more human eye elements such as a cornea center, a center of eyeball rotation, or a pupil center. Gaze detection may be used to identify where the end user is focusing within a field of view. Examples of gaze detection elements may include glint generating illuminators and sensors for capturing data representing the generated glints. In some cases, the center of the cornea can be determined based on two glints using planar geometry. The center of the cornea links the pupil center and the center of rotation of the eyeball, which may be treated as a fixed location for determining an optical axis of the end user's eye at a certain gaze or viewing angle.

Figure 2C:
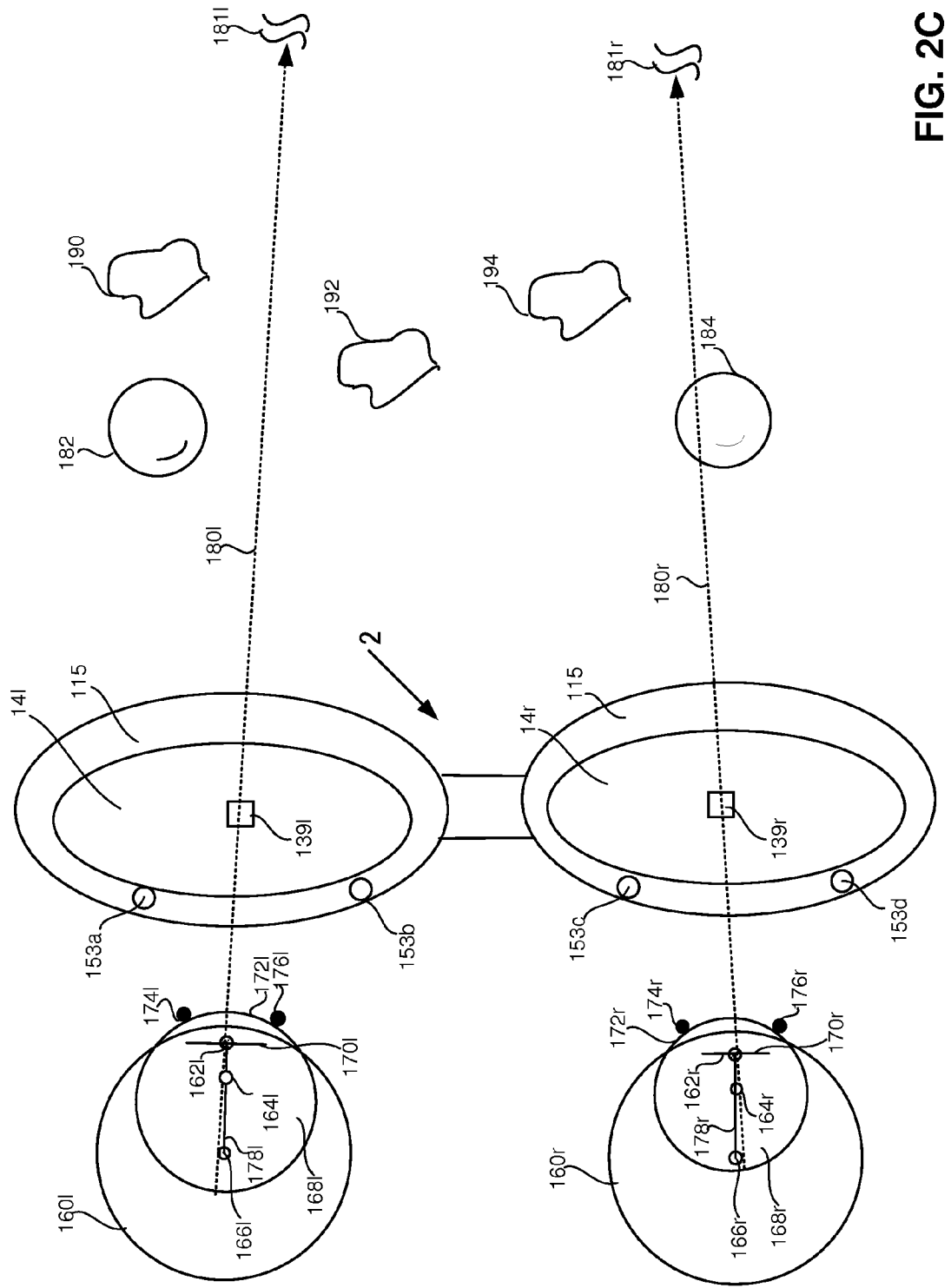
FIG. 2C depicts one embodiment of a portion of an HMD in which gaze vectors extending to a point of gaze are used for aligning a far inter-pupillary distance (IPD).

FIG. 2C depicts one embodiment of a portion of an HMD 2 in which gaze vectors extending to a point of gaze are used for aligning a far inter-pupillary distance (IPD). HMD 2 is one example of a mobile device, such as mobile device 19 in FIG. 1. As depicted, gaze vectors 180*l* and 180*r* intersect at a point of gaze that is far away from the end user (i.e., the gaze vectors 180*l* and 180*r* do not intersect as the end user is looking at an object far away). A model of the eyeball for eyeballs 160*l* and 160*r* is illustrated for each eye based on the Gullstrand schematic eye model. Each eyeball is modeled as a sphere with a center of rotation 166 and includes a cornea 168 modeled as a sphere having a center 164. The cornea 168 rotates with the eyeball, and the center of rotation 166 of the eyeball may be treated as a fixed point. The cornea 168 covers an iris 170 with a pupil 162 at its center. On the surface 172 of each cornea are glints 174 and 176.

As depicted in FIG. 2C, a sensor detection area 139 (i.e., 139*l* and 139*r*, respectively) is aligned with the optical axis of each display optical system 14 within an eyeglass frame 115. In one example, the sensor associated with the detection area may include one or more cameras capable of capturing image data representing glints 174*l* and 176*l* generated respectively by illuminators 153*a* and 153*b* on the left side of the frame 115 and data representing glints 174*r* and 176*r* generated respectively by illuminators 153*c* and 153*d* on the right side of the frame 115. Through the display optical systems 14*l* and 14*r* in the eyeglass frame 115, the end user's field of view includes both real objects 190, 192, and 194 and virtual objects 182 and 184.

The axis 178 formed from the center of rotation 166 through the cornea center 164 to the pupil 162 comprises the optical axis of the eye. A gaze vector 180 may also be referred to as the line of sight or visual axis which extends from the fovea through the center of the pupil 162. In some embodiments, the optical axis is determined and a small correction is determined through user calibration to obtain the visual axis which is selected as the gaze vector. For each end user, a virtual object may be displayed by the display device at each of a number of predetermined positions at different horizontal and vertical positions. An optical axis may be computed for each eye during display of the object at each position, and a ray modeled as extending from the position into the user's eye. A gaze offset angle with horizontal and vertical components may be determined based on how the optical axis must be moved to align with the modeled ray. From the different positions, an average gaze offset angle with horizontal or vertical components can be selected as the small correction to be applied to each computed optical axis. In some embodiments, only a horizontal component is used for the gaze offset angle correction.

As depicted in FIG. 2C, the gaze vectors 180*l* and 180*r* are not perfectly parallel as the vectors become closer together as they extend from the eyeball into the field of view at a point of gaze. At each display optical system 14, the gaze vector 180 appears to intersect the optical axis upon which the sensor detection area 139 is centered. In this configuration, the optical axes are aligned with the inter-pupillary distance (IPD). When an end user is looking straight ahead, the IPD measured is also referred to as the far IPD.

Figure 2D:
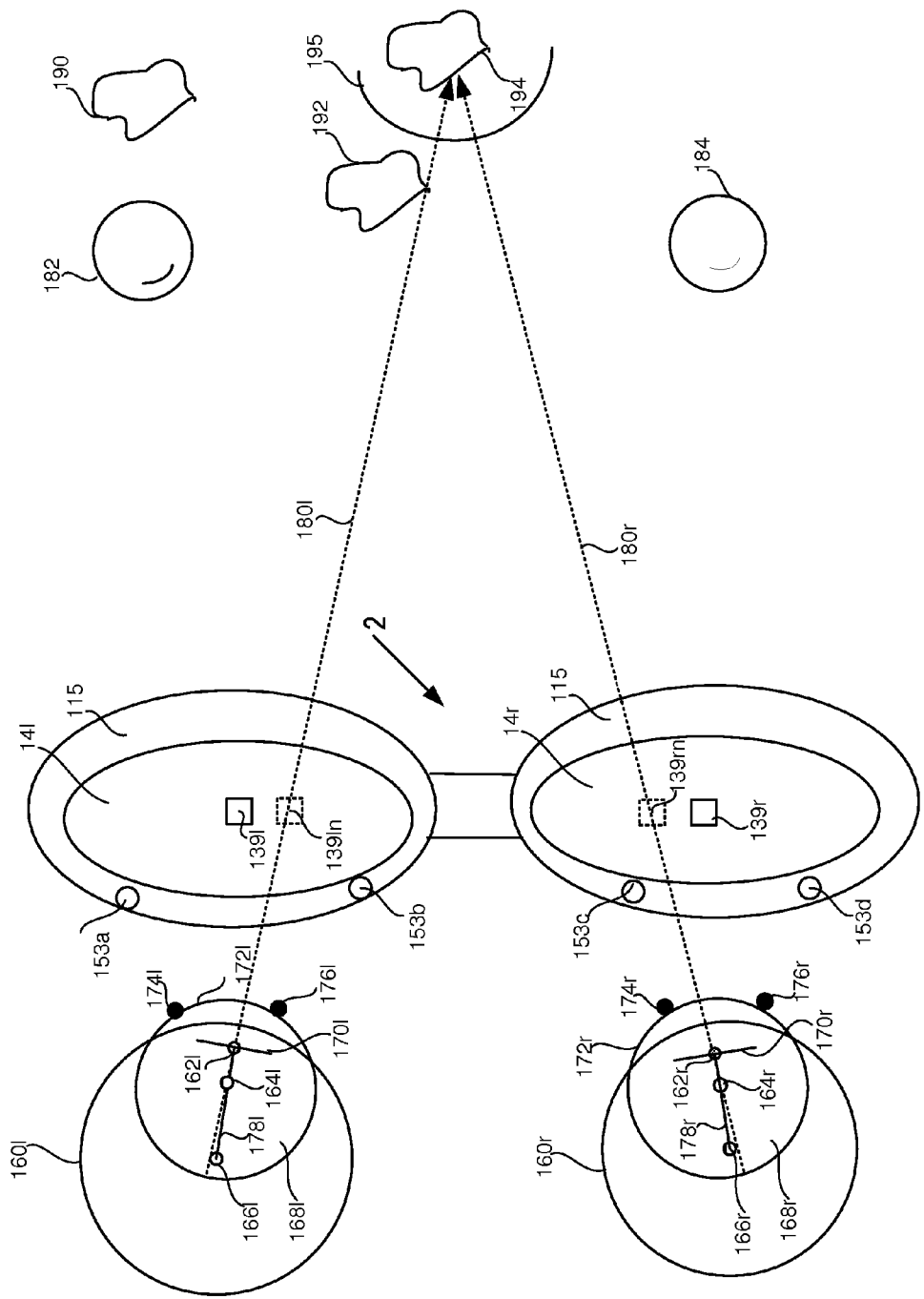
FIG. 2D depicts one embodiment of a portion of an HMD in which gaze vectors extending to a point of gaze are used for aligning a near inter-pupillary distance (IPD).

FIG. 2D depicts one embodiment of a portion of an HMD 2 in which gaze vectors extending to a point of gaze are used for aligning a near inter-pupillary distance (IPD). HMD 2 is one example of a mobile device, such as mobile device 19 in FIG. 1. As depicted, the cornea 168*l* of the left eye is rotated to the right or towards the end user's nose, and the cornea 168*r* of the right eye is rotated to the left or towards the end user's nose. Both pupils are gazing at a real object 194 within a particular distance of the end user. Gaze vectors 180*l* and 180*r* from each eye enter the Panum's fusional region 195 in which real object 194 is located. The Panum's fusional region is the area of single vision in a binocular viewing system like that of human vision. The intersection of the gaze vectors 180*l* and 180*r* indicates that the end user is looking at real object 194. At such a distance, as the eyeballs rotate inward, the distance between their pupils decreases to a near IPD. The near IPD is typically about 4 mm less than the far IPD. A near IPD distance criteria (e.g., a point of gaze at less than four feet from the end user) may be used to switch or adjust the IPD alignment of the display optical systems 14 to that of the near IPD. For the near IPD, each display optical system 14 may be moved toward the end user's nose so the optical axis, and detection area 139, moves toward the nose a few millimeters as represented by detection areas 139*ln* and 139*rn*.

More information about determining the IPD for an end user of an HMD and adjusting the display optical systems accordingly can be found in U.S. patent application Ser. No. 13/250,878, entitled "Personal Audio/Visual System," filed Sep. 30, 2011, which is herein incorporated by reference in its entirety.

Figure 3A:
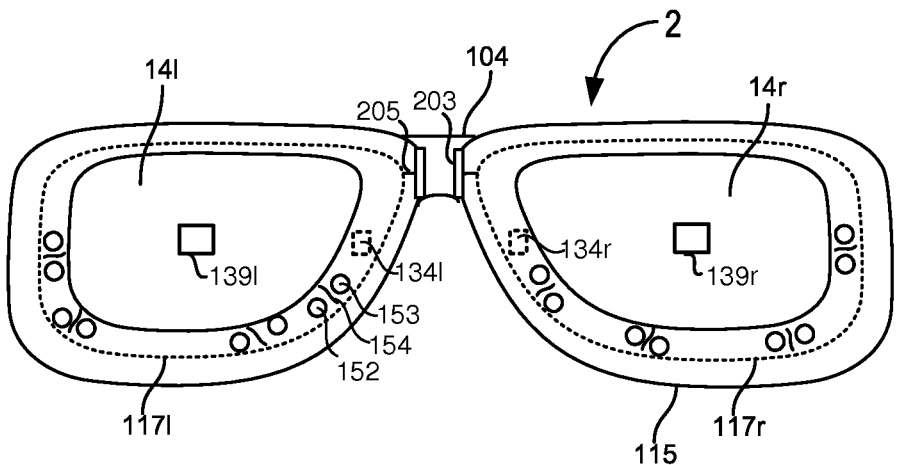
FIG. 3A depicts one embodiment of a portion of an HMD with movable display optical systems including gaze detection elements.

FIG. 3A depicts one embodiment of a portion of an HMD 2 with movable display optical systems including gaze detection elements. What appears as a lens for each eye represents a display optical system 14 for each eye (i.e., 14*l* and 14*r*). A display optical system includes a see-through lens and optical elements (e.g. mirrors, filters) for seamlessly fusing virtual content with the actual direct real world view seen through the lenses of the HMD. A display optical system 14 has an optical axis which is generally in the center of the see-through lens in which light is generally collimated to provide a distortionless view. For example, when an eye care professional fits an ordinary pair of eyeglasses to an end user's face, the glasses are usually fit such that they sit on the end user's nose at a position where each pupil is aligned with the center or optical axis of the respective lens resulting in generally collimated light reaching the end user's eye for a clear or distortionless view.

As depicted in FIG. 3A, a detection area 139*r*, 139*l* of at least one sensor is aligned with the optical axis of its respective display optical system 14*r*, 14*l* so that the center of the detection area 139*r*, 139*l* is capturing light along the optical axis. If the display optical system 14 is aligned with the end user's pupil, then each detection area 139 of the respective sensor 134 is aligned with the end user's pupil. Reflected light of the detection area 139 is transferred via one or more optical elements to the actual image sensor 134 of the camera, which in the embodiment depicted is illustrated by the dashed line as being inside the frame 115. In some embodiments, the sensor 134 may comprise an image sensor or RGB camera for capturing images of an end user's eyes or facial features surrounding the eyes. Other inward facing image sensors may also be integrated with the frame 115 in order to capture fixed facial features associated with the end user such as their nasal bridge.

In one embodiment, the at least one sensor 134 may be a visible light camera (e.g., an RGB or color camera). In one example, an optical element or light directing element comprises a visible light reflecting mirror which is partially transmissive and partially reflective. The visible light camera provides image data of the pupil of the end user's eye, while IR photodetectors 152 capture glints which are reflections in the IR portion of the spectrum. If a visible light camera is used, reflections of virtual images may appear in the eye data captured by the camera. An image filtering technique may be used to remove the virtual image reflections if desired. An IR camera may not be sensitive to the virtual image reflections on the eye.

In another embodiment, the at least one sensor 134 (i.e., 134*l* and 134*r*) is an IR camera or a position sensitive detector (PSD) to which the IR radiation may be directed. The IR radiation reflected from the eye may be from incident radiation of the illuminators 153, other IR illuminators (not shown), or from ambient IR radiation reflected off the eye. In some cases, sensor 134 may be a combination of an RGB and an IR camera, and the light directing elements may include a visible light reflecting or diverting element and an IR radiation reflecting or diverting element. In some cases, the sensor 134 may be embedded within a lens of the system 14. Additionally, an image filtering technique may be applied to blend the camera into a user field of view to lessen any distraction to the user.

As depicted in FIG. 3A, there are four sets of an illuminator 153 paired with a photodetector 152 and separated by a barrier 154 to avoid interference between the incident light generated by the illuminator 153 and the reflected light received at the photodetector 152. To avoid unnecessary clutter in the drawings, drawing numerals are shown with respect to a representative pair. Each illuminator may be an infra-red (IR) illuminator which generates a narrow beam of light at about a predetermined wavelength. Each of the photodetectors may be selected to capture light at about the predetermined wavelength. Infra-red may also include near-infrared. As there can be wavelength drift of an illuminator or photodetector or a small range about a wavelength may be acceptable, the illuminator and photodetector may have a tolerance range about a wavelength for generation and detection. In some embodiments where the sensor is an IR camera or IR position sensitive detector (PSD), the photodetectors may include additional data capture devices and may also be used to monitor the operation of the illuminators, e.g. wavelength drift, beam width changes, etc. The photodetectors may also provide glint data with a visible light camera as the sensor 134.

As depicted in FIG. 3A, each display optical system 14 and its arrangement of gaze detection elements facing each eye (e.g., such as camera 134 and its detection area 139, the illuminators 153, and photodetectors 152) are located on a movable inner frame portion 117*l*, 117*r*. In this example, a display adjustment mechanism comprises one or more motors 203 having a shaft 205 which attaches to the inner frame portion 117 which slides from left to right or vice versa within the frame 115 under the guidance and power of shafts 205 driven by motors 203. In some embodiments, one motor 203 may drive both inner frames.

Figure 3B:
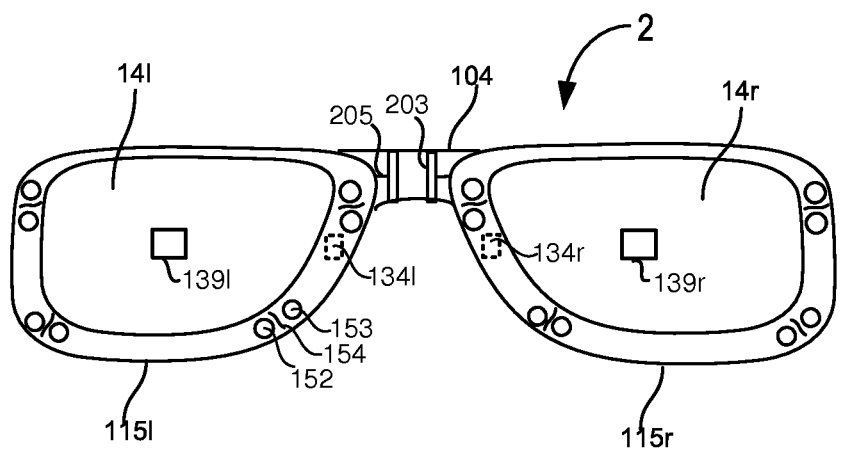
FIG. 3B depicts an alternative embodiment of a portion of an HMD with movable display optical systems including gaze detection elements.

FIG. 3B depicts an alternative embodiment of a portion of an HMD 2 with movable display optical systems including gaze detection elements. As depicted, each display optical system 14 is enclosed in a separate frame portion 115*l*, 115*r*.

Each of the frame portions may be moved separately by the motors 203. In some embodiments, the at least one sensor 134 may comprise an image sensor or RGB camera for capturing images of an end user's eyes or facial features surrounding the eyes. Other inward facing image sensors may be integrated with the frame 115 in order to capture fixed facial features associated with the end user such as their nasal bridge.

Figure 4A:
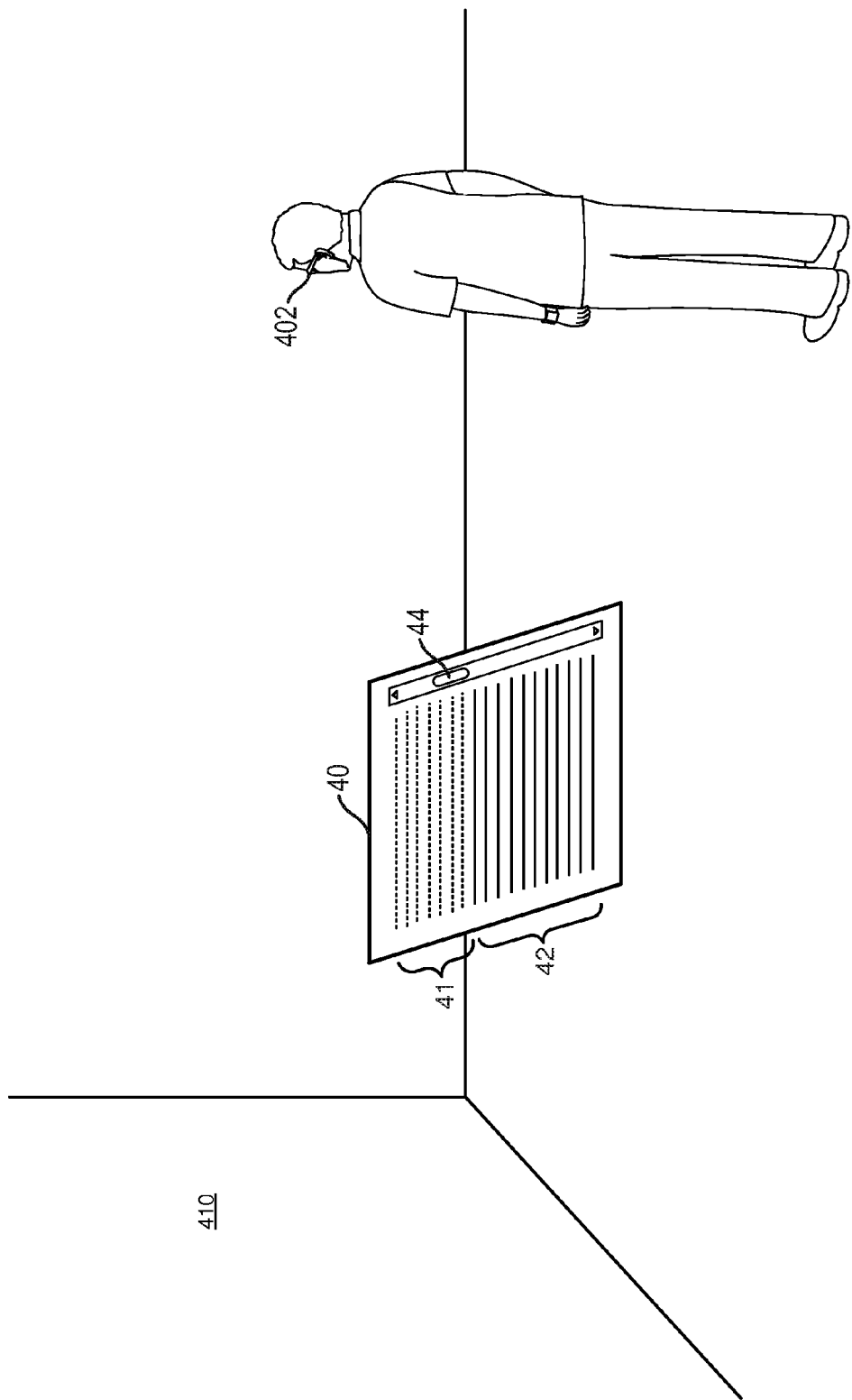
FIG. 4A depicts one embodiment of an HMD worn by an end user viewing a virtual content reader within an augmented reality environment.

FIG. 4A depicts one embodiment of an HMD 402 worn by an end user viewing a virtual content reader 40 within an augmented reality environment 410. The HMD 402 may comprise a mobile device, such as mobile device 19 in FIG. 1. The virtual content reader 40 may include a scrollbar 44 and a display region for displaying content to the end user. The display region may comprise a first region 41 corresponding with a first portion of the content that has already been read by the end user and a second region 42 corresponding with a second portion of the content that has not been read by the end user. Prior to being displayed on the virtual content reader, the content to be displayed may be converted from a multiple column format into a single column format. To improve content tracking as the content is being automatically scrolled on the virtual content reader 40, as the end user reads particular portions of the displayed content, such as words, sentences, or paragraphs, a color of the previously read portions of the displayed content may be changed. For example, the content (e.g., text) within the first region 41 may be colored red and the content (e.g., text) within the second region 42 may be colored blue.

In one embodiment, the end user of HMD 402 may gaze at the scrollbar 44 for a particular period of time (e.g., two seconds) causing a first triggering event in which the end user may control the scrollbar 44 for scrolling content displayed using the virtual content reader 40. To control the scrollbar 44, the end user may move their head in an up and down motion. In some cases, once the first triggering event has been detected by the HMD, the scrollbar 44 may be highlighted or a red dot may appear within the scrollbar 44 and movement of the red dot may correspond with a head position of the end user of the HMD. Head tracking techniques may be used to determine a head movement speed and a degree of head movement for determining an updated position for the scrollbar 44. A new position for the scrollbar 44 may be determined based on the head movement speed and the degree of head movement. The new position of the scrollbar 44 may correspond with new content to be displayed on the virtual content reader 40. To prevent confusion of the automatic scrolling mechanism caused by the end user moving their gaze away from the display region of the virtual content reader 40 for displaying content, automatic content scrolling may be disabled (e.g., automatic scrolling may be stopped) once the first triggering event has been detected. In one embodiment, the automatic content scrolling may be restarted upon detection that the end user has resumed reading content within the display region of the virtual content reader 40. In another embodiment, the automatic content scrolling may be restarted after a time delay has passed (e.g., three seconds) subsequent to the end user moving the scrollbar 44 to the new position.

Figure 4B:
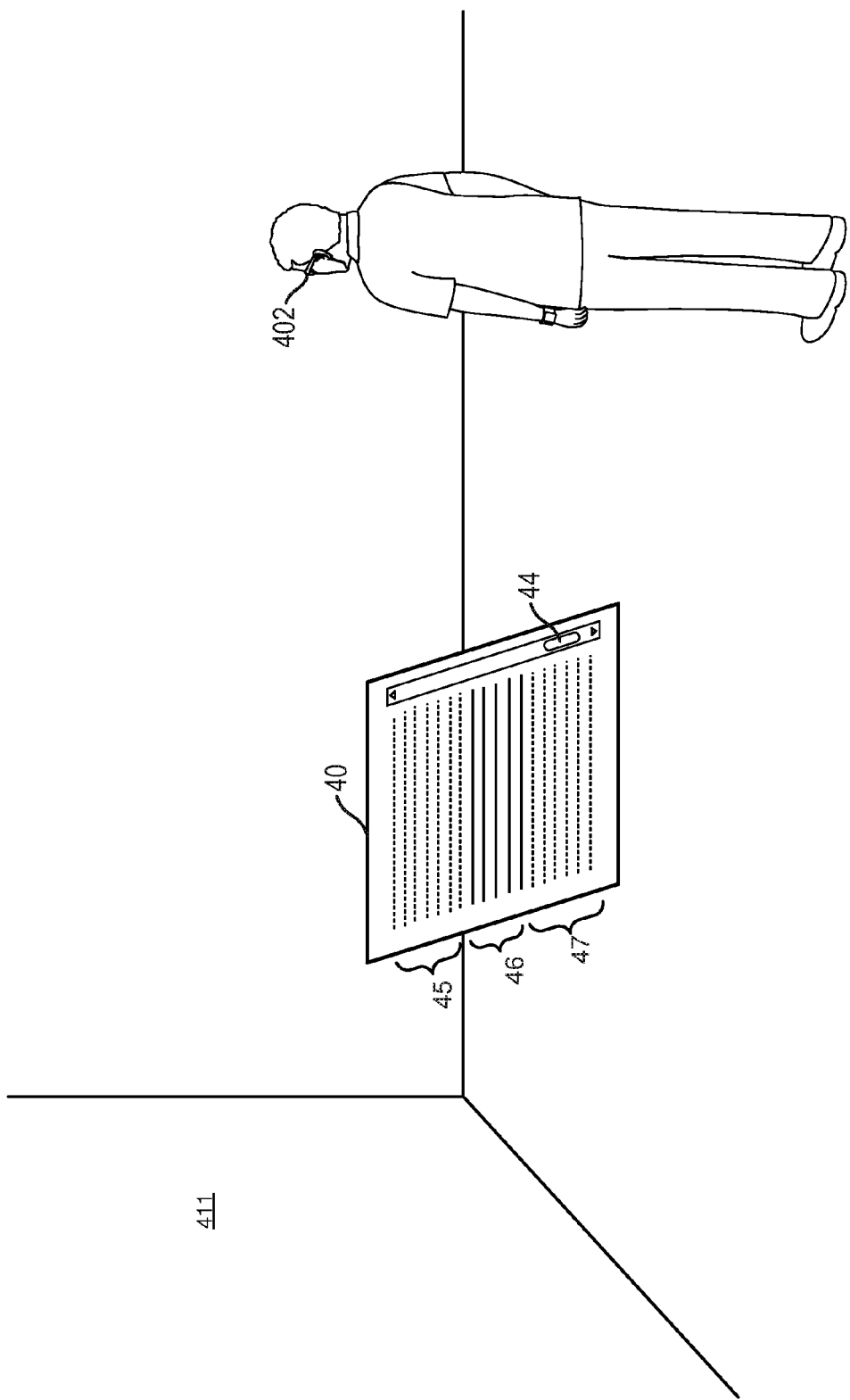
FIG. 4B depicts one embodiment of an HMD worn by an end user viewing a virtual content reader within an augmented reality environment.

FIG. 4B depicts one embodiment of an HMD 402 worn by an end user viewing a virtual content reader 40 within an augmented reality environment 411. The HMD 402 may comprise a mobile device, such as mobile device 19 in FIG. 1. The virtual content reader 40 may include a scrollbar 44 (that has scrolled towards the end of the content available relative to its location in FIG. 4A) and a display region for displaying content to the end user. The display region may comprise a first region 45 corresponding with a top section of the virtual content reader 40, a second region 46 corresponding with a midsection of the virtual content reader 40, and a third region 47 corresponding with a bottom section of the virtual content reader 40. The end user may view content as the content is automatically scrolled at a reading speed using the virtual content reader 40. Once a triggering event associated with controlling the scrollbar 44 has been detected, automatic content scrolling may be disabled and head tracking of the end user of the HMD 402 may be enabled. In one embodiment, the automatic content scrolling may resume once the end user has started reading content within the second region 46. In another embodiment, the automatic content scrolling may resume once the end user has read at least one sentence within the first region 45. In some cases, the second region 46 corresponding with the midsection of the virtual content reader 40 may be highlighted to guide the end user to the content located within the midsection of the virtual content reader 40.

FIG. 4C depicts one embodiment of an HMD 402 worn by an end user viewing a virtual content reader 40 within an augmented reality environment 412. The HMD 402 may comprise a mobile device, such as mobile device 19 in FIG. 1. The virtual content reader 40 may include a scrollbar, a display region for displaying content to the end user, and one or more bookmarks pointing to locations within the content, such as first bookmark 48 and second bookmark 49. In some embodiments, prior to displaying content on the virtual content reader 40, HMD 402 may acquire a set of bookmarks associated with the content. Each bookmark of the set of bookmarks may correspond with a location within the content. The location may be associated with a word, a sentence, a paragraph, or a section within the content. As depicted, the first bookmark 48 may be associated with the last read paragraph by the end user and the second bookmark 49 may be associated with the paragraph in which the end user has spent the most time reading (or focused on for the longest period of time). The end user of the HMD 402 may select either the first bookmark 48 or the second bookmark 49 by gazing at the scrollbar for a particular period of time (e.g., two seconds) causing a first triggering event in which the end user may control the scrollbar and/or selection of bookmarks and then performing a head gesture to select a particular bookmark (e.g., using head movements to move a red dot overlaying the scrollbar to overlay the first bookmark 48 and then performing a left to right head shaking gesture to select the first bookmark 48). In some cases, the end user of the HMD 402 may select the first bookmark 48 by gazing directly at the first bookmark 48 for a particular period of time (e.g., two seconds) which causes the virtual content reader 40 to jump to and display a portion of the content associated with the first bookmark 48.

Figure 5:
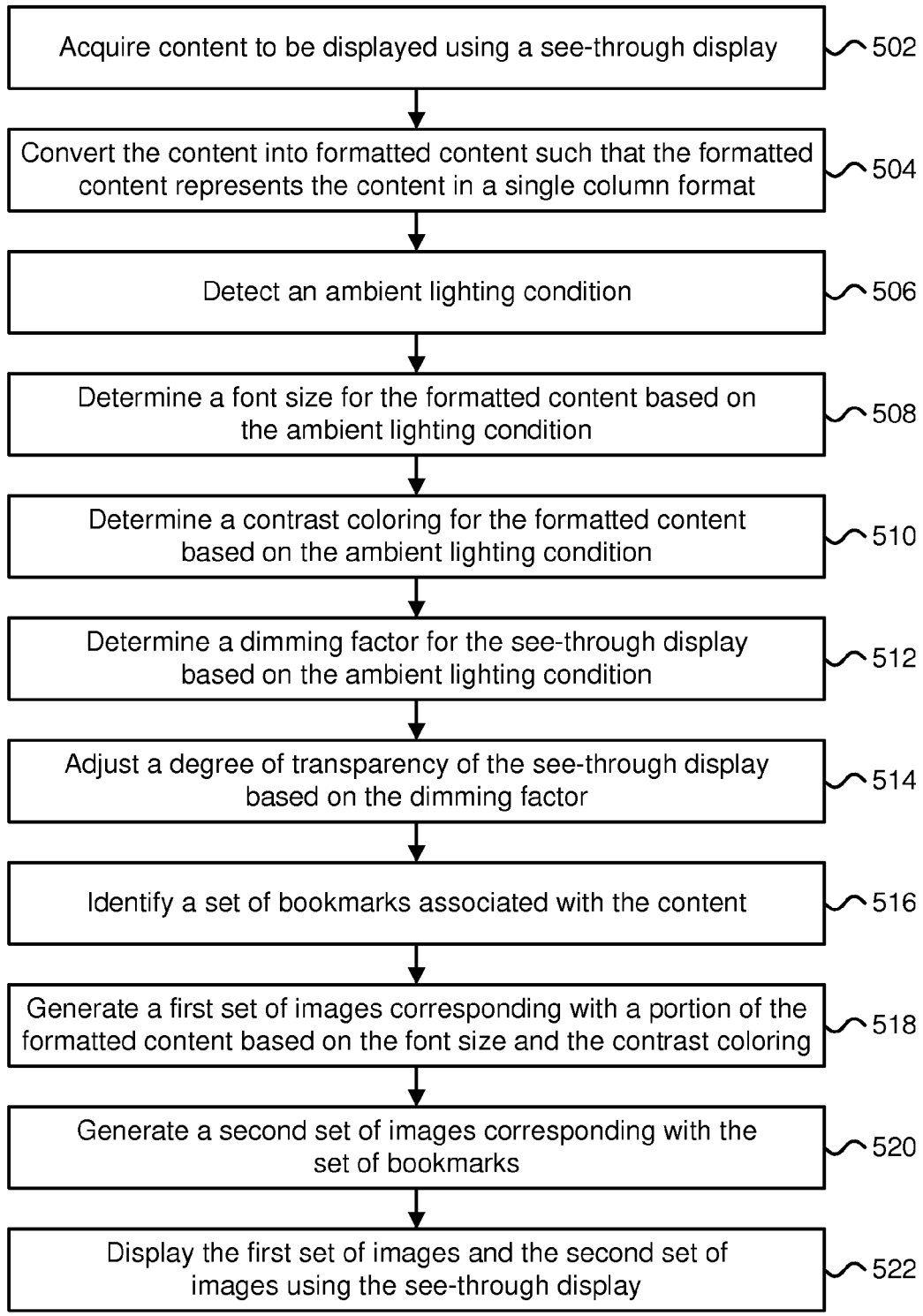
FIG. 5 is a flowchart describing one embodiment of a method for displaying content using an HMD.

FIG. 5 is a flowchart describing one embodiment of a method for displaying content using an HMD. In one embodiment, the process of FIG. 5 may be performed by a mobile device, such as mobile device 19 in FIG. 1.

In step 502, content to be displayed using a see-through display is acquired. The see-through display may comprise a display of an HMD. The content may comprise text, symbols, and/or images. In one example, the content may comprise text associated with an electronic book, an electronic magazine, a word processing document, a webpage, or an email. In step 504, the content is converted into formatted content such that the formatted content represents the content in a single column format. In one embodiment, the content to be displayed on a virtual content reader may be converted from a multiple column format into a single column format. Converting the content into a single column format may make it easier for an end user of the HMD to follow the content as it is automatically scrolled. In one example, an electronic document that has been formatted using three columns of text may be converted into a formatted document using only a single column of text.

In step 506, an ambient lighting condition is detected. The ambient lighting condition may be detected by capturing images of an environment using a front facing camera of an HMD. The captured images may correspond with a region of an augmented reality environment in which a virtual content reader has been placed. In one embodiment, the ambient lighting condition may comprise a degree of brightness associated with a region of the environment in which a virtual content reader has been placed. For example, if the virtual content reader has been placed on a wall within the environment, then a degree of brightness associated with a region of the wall including the virtual content reader may be determined. In another embodiment, the ambient lighting condition may comprise an average degree of brightness associated with an environment over a particular period of time (e.g., 30 seconds). In this case, the virtual content reader may comprise a head-locked virtual object. For example, the virtual content reader may appear in the top left corner of the end user's point of view regardless of how the end user turns their head.

In step 508, a font size for the formatted content is determined based on the ambient lighting condition. In step 510, a contrast coloring for the formatted content is determined based on the ambient lighting condition. The contrast coloring may correspond with a first color associated with text and a second color associated with a background over which the text is overlaid. A high degree of contrast between the first color and the second color may allow an end user of the HMD to more clearly read the text. Adjustments to the font size and/or the contrast coloring may depend on both the lighting condition and a perceived distance of the virtual content reader from the end user of the HMD (e.g., if the end user is viewing a virtual content reader located on a wall that is 10 meters away from the end user). In one example, if the end user is in a dark room, then the font size may be reduced. In another example, if the end user is in a bright environment (e.g., outside on a sunny day), then the font size may be increased and instead of displaying black text on a white background, the virtual content reader may display the content using blue text overlaying an orange background if the virtual content reader is more than 2 feet away.

In step 512, a dimming factor for the see-through display is determined based on the ambient lighting condition. The dimming factor may correspond with an adjustment to a degree of transparency for the see-through display. In step 514, a degree of transparency of the see-through display is adjusted based on the dimming factor. In one embodiment, an HMD may set a low dimming factor (i.e., providing little or no dimming of the see-through display) if the HMD is in a dark environment. In another embodiment, an HMD may set a high dimming factor (e.g., a dimming factor that causes a dimming of the see-through display such that the visible light transmission through the see-through display is reduced by more than 40%) if the HMD is in a bright environment. In some cases, dimming a see-through display of the HMD when the HMD is in a bright environment may allow the use of dark-colored text (e.g., nearly black text) over a light-colored background. The dimming factor may correspond with a particular voltage applied to the see-through display that adjusts the degree of transparency. In one embodiment, the see-through display may include an electrochromic material. In another embodiment, the see-through display may include an electrically controlled film in which numerous microscopic particles are suspended (i.e., a suspended particular film).

In step 516, a set of bookmarks associated with the content is identified. In some embodiments, prior to displaying content on a virtual content reader, an HMD may acquire a set of bookmarks associated with the content. Each bookmark of the set of bookmarks may correspond with a location within the content. The location may be associated with a word, a sentence, a paragraph, or a section within the content. A first bookmark of the set of bookmarks may be associated with the last portion of the content that was viewed by the end user of the HMD (e.g., the last read sentence or paragraph or the last viewed image). A second bookmark of the set of bookmarks may be associated with the most frequently read section of the content that was read by the end user of the HMD (e.g., the most frequently read paragraph).

In step 518, a first set of images corresponding with a portion of the formatted content is generated based on the font size and the contrast coloring. In step 520, a second set of images corresponding with the set of bookmarks is generated. A first bookmark of the set of bookmarks may be associated with the last paragraph read by an end user of an HMD, such as the first bookmark 48 in FIG. 4C. In step 522, the first set of images is displayed using the see-through display. The first set of images may correspond with a virtual content reader within an augmented reality environment. In some cases, both the first set of images and the second set of images may be displayed using the see-through display. Both the first set of images and the second set of images may correspond with a virtual content reader presented to an end user of an HMD, such as virtual content reader 40 in FIG. 4A.

Figure 6A:
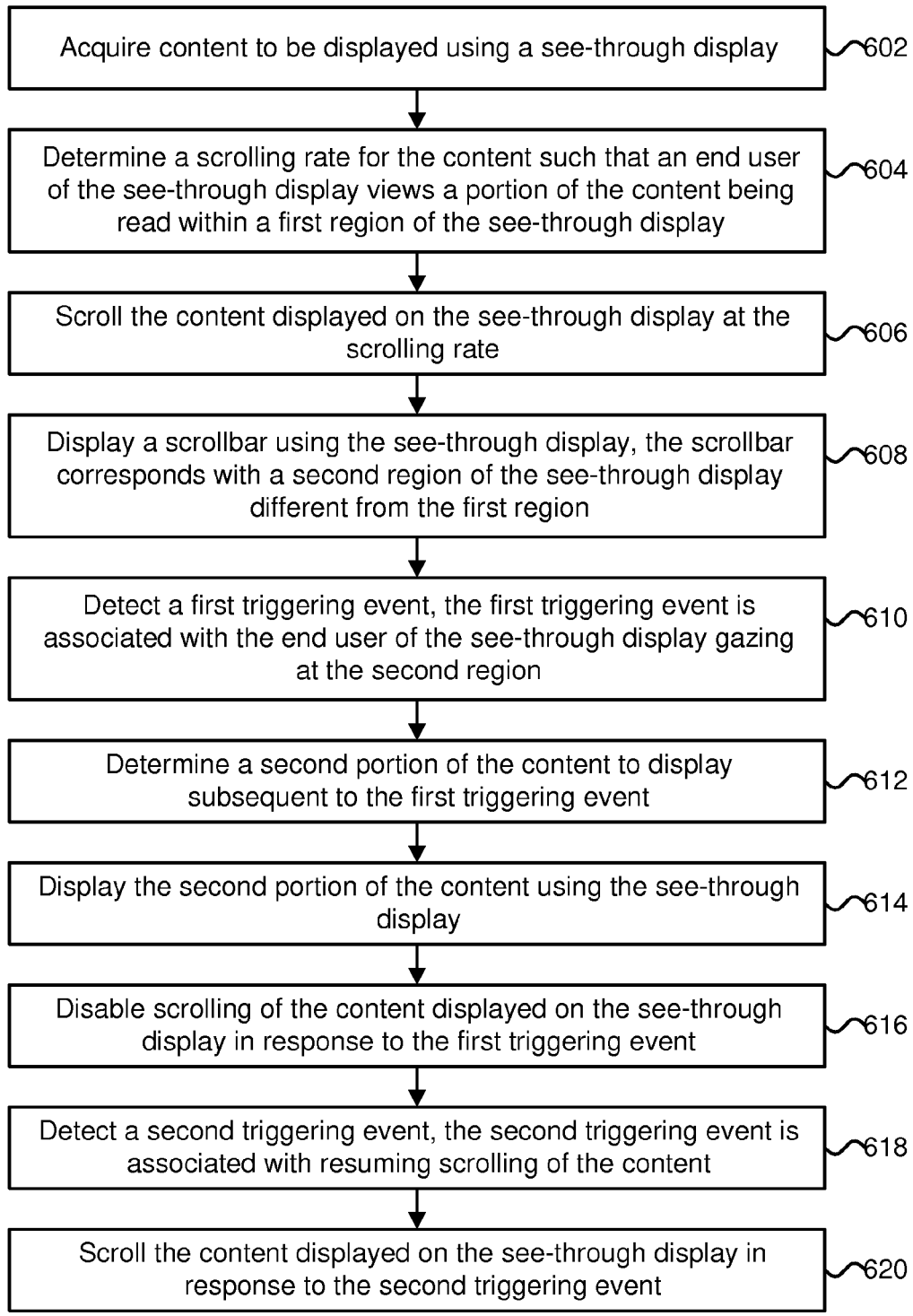
FIG. 6A is a flowchart describing one embodiment of a method for performing automatic content scrolling using an HMD.

FIG. 6A is a flowchart describing one embodiment of a method for performing automatic content scrolling using an HMD. In one embodiment, the process of FIG. 6A may be performed by a mobile device, such as mobile device 19 in FIG. 1.

In step 602, content to be displayed using a see-through display is acquired. The see-through display may comprise a display of an HMD. The content may be acquired from a server, such as server 15 in FIG. 1. The content may comprise text, symbols, and/or images. In one example, the content may comprise text associated with an electronic book, an electronic magazine, a word processing document, a webpage, or an email.

In step 604, a scrolling rate for the content is determined such that an end user of the see-through display views a portion of the content being read within a first region of the see-through display. The first region of the see-through display may correspond with a midsection of a virtual content reader, such as the second region 46 in FIG. 4B. In one embodiment, the portion of the content being read may correspond with a paragraph being read by the end user. In step 606, the content displayed on the see-through display is automatically scrolled at the scrolling rate.

The content displayed on the see-through display may be presented to the end user of the see-through display as being displayed from a virtual content reader within an augmented reality environment, such as virtual content reader 40 in FIG. 4A. In some cases, the content displayed within a midsection of a virtual content reader may be scrolled at the scrolling rate. In other cases, the content displayed across all sections of the virtual content reader may be scrolled at the scrolling rate.

In step 608, a scrollbar is displayed using the see-through display. The scrollbar may correspond with a second region of the see-through display different from the first region. The second region may be placed adjacent to the first region. In one embodiment, the scrollbar may be positioned adjacent to the first region for displaying content (e.g., along one side of the area displaying content).

In step 610, a first triggering event is detected. The first triggering event may be associated with an end user of the see-through display gazing at the second region. In one embodiment, the first triggering event may be detected if an end user of an HMD gazes at the second region (i.e., the scrollbar) for a particular period of time (e.g., two seconds). Once the first triggering event has been detected, the end user may move their head in an up and down motion in order to control the scrollbar. In some cases, once the first triggering event has been detected by the HMD, the scrollbar may be highlighted or a red dot may appear within the scrollbar and movement of the red dot may correspond with a head position of the end user.

In step 612, a second portion of the content to display is determined subsequent to the first triggering event. The second portion of the content may correspond with a repositioning of the scrollbar by the end user (e.g., moving the scrollbar towards an end of an electronic document). In step 614, the second portion of the content is displayed using the see-through display. Head tracking techniques may be used to determine a head movement speed, a head movement direction, and a degree of head movement for the end user. The head movement speed, the head movement directions, and the degree of head movement may be used to determine an updated position for the scrollbar. In some cases, eye tracking may be used for detecting the first triggering event (e.g., that the end user has gazed at the scrollbar for two seconds) and head tracking may be used for controlling the scrollbar once the first triggering event has been detected (e.g., the end user may control the scrollbar based on a direction and speed of their head movements).

In step 616, scrolling of the content displayed on the see-through display is disabled in response to the first triggering event. In step 618, a second triggering event is detected. A second triggering event may be associated with resuming scrolling of the content. In step 620, the content displayed on the see-through display is automatically scrolled in response to the second triggering event. To prevent confusion of the automatic scrolling mechanism caused by an end user of an HMD moving their gaze away from a display region of a virtual content reader, automatic content scrolling may be disabled once the first triggering event has been detected. In one embodiment, the automatic content scrolling may be restarted upon detection that the end user has resumed reading content within the display region of the virtual content reader or within a midsection of the display region of the virtual content reader. In another embodiment, the automatic content scrolling may be restarted after a time delay has passed (e.g., three seconds) subsequent to the end user moving the scrollbar to a new or updated position.

Figure 6B:
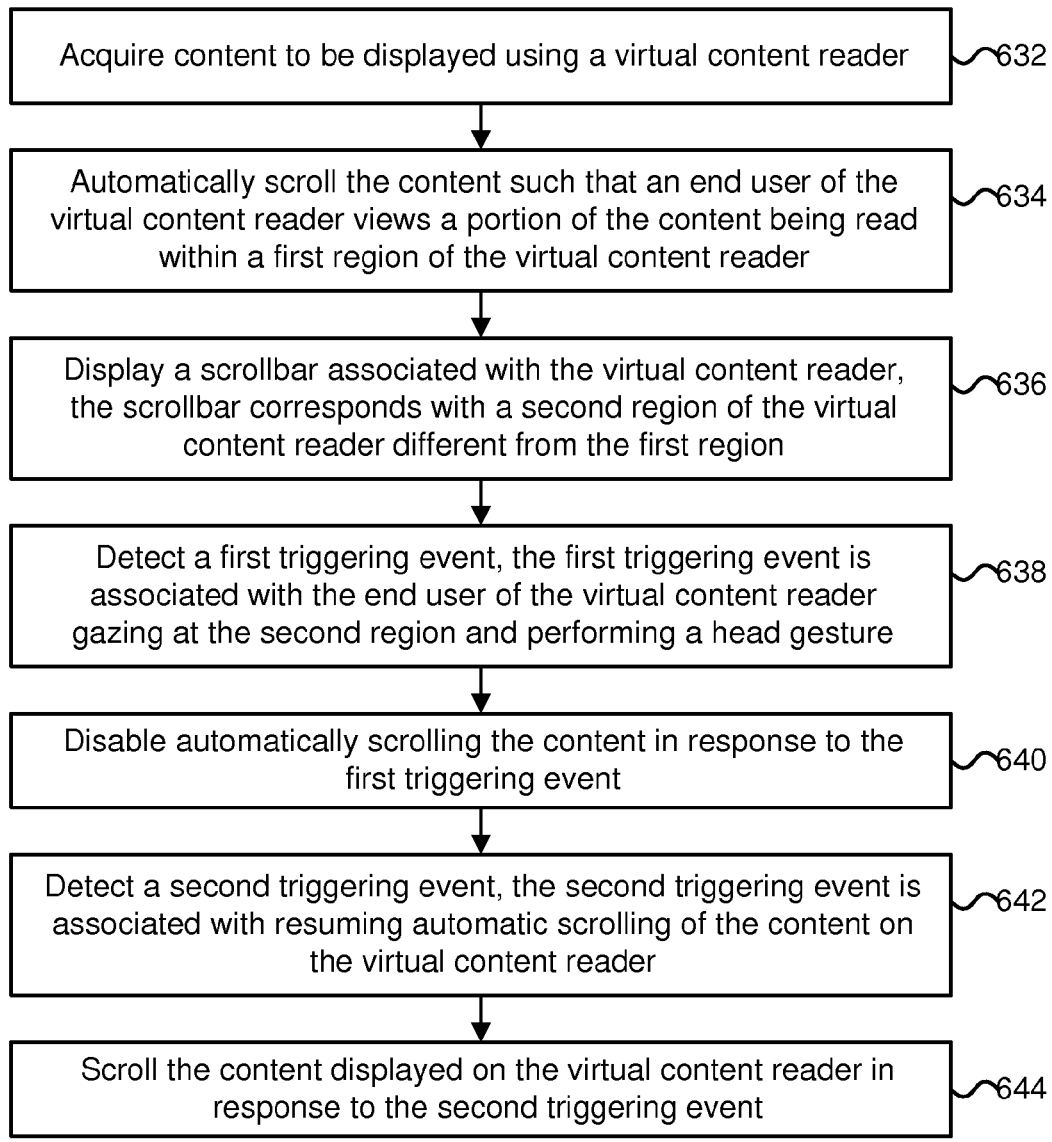
FIG. 6B is a flowchart describing an alternative embodiment of a method for performing automatic content scrolling using an HMD.

FIG. 6B is a flowchart describing an alternative embodiment of a method for performing automatic content scrolling using an HMD. In one embodiment, the process of FIG. 6B may be performed by a mobile device, such as mobile device 19 in FIG. 1.

In step 632, content to be displayed using a virtual content reader is acquired. The virtual content reader may correspond with a virtual object within an augmented reality environment. The virtual content reader may comprise a head-locked virtual object or a world-locked virtual object. The augmented reality environment may be displayed to an end user of an HMD using a see-through display of the HMD. The content may be acquired from a server, such as server 15 in FIG. 1. The content may comprise text, symbols, and/or images. In one example, the content may comprise text associated with an electronic book, an electronic magazine, a word processing document, a webpage, or an email.

In step 634, the content is automatically scrolled such that an end user of the virtual content reader views a portion of the content being read within the first region of the virtual content reader. In one embodiment, the first portion of the content may correspond with a paragraph being read by the end user and the first region of the virtual content reader may correspond with a midsection of the virtual content reader, such as the second region 46 in FIG. 4B.

In step 636, a scrollbar associated with the virtual content reader is displayed. The scrollbar may correspond with a second region of the virtual content reader different from the first region of the virtual content reader. The second region may be placed adjacent to the first region. In one embodiment, the scrollbar may be positioned adjacent to the first region for displaying content (e.g., along one side of the area displaying content).

In some embodiments, the scrollbar may include a scrollbar preview window virtualization that displays a portion of the content displayed on the virtual content reader. The scrollbar preview window may allow the end user of the HMD to scroll through and preview the content without having to look away from the scrollbar area while they are controlling the scrollbar. In one example, the scrollbar preview window may display a scaled-down version of the current page displayed on the virtual content reader. In another example, the scrollbar preview window may display one or more keywords from the current page displayed on the virtual content reader. In some cases, the scrollbar preview window may be displayed in response to the end user gazing at the scrollbar for a particular period of time (e.g., two seconds).

In step 638, a first triggering event is detected. The first triggering event may be associated with the end user of the virtual content reader gazing at the second region and performing a head gesture. In one embodiment, the first triggering event may be detected if an end user of an HMD gazes at the second region (i.e., the scrollbar) for a particular period of time (e.g., two seconds) and during the particular period of time nods their head. Once the first triggering event has been detected, the end user may move their head in an up and down motion in order to control the scrollbar. In some cases, once the first triggering event has been detected by the HMD, the scrollbar may be highlighted or a red dot may appear within the scrollbar and movement of the red dot may correspond with a head position of the end user.

In step 640, automatic scrolling of the content is disabled in response to the first triggering event. In step 642, a second triggering event is detected. The second triggering event may be associated with resuming automatic scrolling of the content on the virtual content reader. In step 644, the content displayed on the virtual content reader is automatically scrolled in response to the second triggering event. To prevent confusion of the automatic scrolling mechanism caused by an end user of an HMD moving their gaze away from a display region of a virtual content reader, automatic content scrolling may be disabled once the first triggering event has been detected. In one embodiment, the automatic content scrolling may be restarted upon detection that the end user has resumed reading content within the display region of the virtual content reader or within a midsection of the display region of the virtual content reader. In another embodiment, the automatic content scrolling may be restarted after a time delay has passed (e.g., three seconds) subsequent to the end user moving the scrollbar to a new or updated position.

One embodiment of the disclosed technology includes one or more processors in communication with a see-through display. The see-through display displays a virtual content reader to an end user of an electronic device. The electronic device may comprise an HMD. The one or more processors determine a scrolling rate for the virtual content reader such that the end user views a first portion of the content being read within a first region of the virtual content reader. The one or more processors cause the first portion of the content displayed using the virtual content reader to be scrolled at the scrolling rate. The virtual content reader includes a scrollbar corresponding with a second region of the virtual content reader different from the first region. The one or more processors detect a first triggering event that includes detecting that the end user has gazed at the second region. The one or more processors disable scrolling of the first portion of the content in response to detecting the first triggering event. The one or more processors detect a second triggering event that includes detecting that the end user has gazed at the first region for at least a first period of time. The one or more processors cause a second portion of the content displayed using the virtual content reader to be scrolled in response to detecting that the end user has gazed at the first region for at least the first period of time.

One embodiment of the disclosed technology includes acquiring content to be displayed using an HMD, determining a scrolling rate for the content such that an end user of the HMD views a first portion of the content being read within a first region of a see-through display of the HMD, scrolling the first portion of the content displayed on the see-through display at the scrolling rate, and displaying a scrollbar using the see-through display. The scrollbar corresponds a second region of the see-through display different from the first region. The method further comprises detecting a first triggering event subsequent to the scrolling the first portion of the content. The detecting a first triggering event includes detecting that the end user of the HMD has gazed at the second region. The method further comprises disabling the scrolling the first portion of the content in response to detecting the first triggering event and detecting a second triggering event subsequent to the disabling. The detecting a second triggering event includes detecting that the end user of the HMD has gazed at the first region for at least a first period of time. The method further comprises scrolling a second portion of the content displayed on the see-through display in response to detecting the second triggering event.

One embodiment of the disclosed technology includes displaying a virtual content reader to an end user of an HMD, determining a scrolling rate for the virtual content reader such that the end user of the HMD views a first portion of the content within a first region of the virtual content reader, and scrolling the first portion of the content displayed using the virtual content reader at the scrolling rate. The virtual content reader includes a scrollbar corresponding with a second region of the virtual content reader different from the first region. The method further comprises detecting a first triggering event subsequent to the scrolling the first portion of the content. The detecting a first triggering event includes detecting that the end user of the HMD has gazed at the second region. The method further comprises disabling the scrolling the first portion of the content in response to detecting the first triggering event and detecting a second triggering event subsequent to the disabling. The detecting a second triggering event includes detecting that the end user of the HMD has gazed at the first region for at least a first period of time. The method further comprises scrolling a second portion of the content displayed using the virtual content reader in response to detecting the second triggering event.

Figure 7:
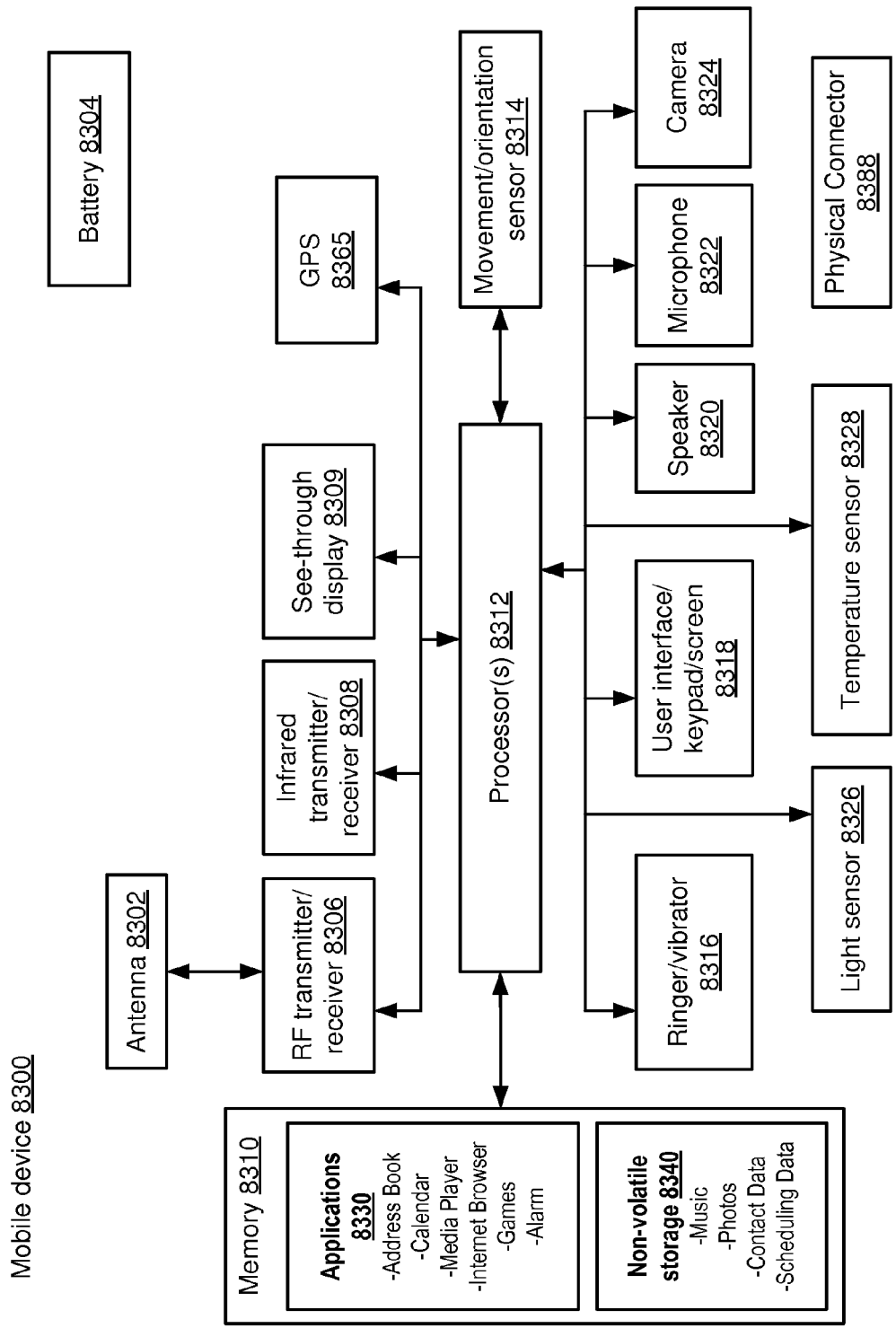
FIG. 7 is a block diagram of one embodiment of a mobile device.

FIG. 7 is a block diagram of one embodiment of a mobile device 8300, such as mobile device 19 in FIG. 1. Mobile devices may include laptop computers, pocket computers, mobile phones, HMDs, personal digital assistants, and hand-held media devices that have been integrated with wireless receiver/transmitter technology.

Mobile device 8300 includes one or more processors 8312 and memory 8310. Memory 8310 includes applications 8330 and non-volatile storage 8340. Memory 8310 can be any variety of memory storage media types, including non-volatile and volatile memory. A mobile device operating system handles the different operations of the mobile device 8300 and may contain user interfaces for operations, such as placing and receiving phone calls, text messaging, checking voicemail, and the like. The applications 8330 can be any assortment of programs, such as a camera application for photos and/or videos, an address book, a calendar application, a media player, an internet browser, games, an alarm application, and other applications. The non-volatile storage component 8340 in memory 8310 may contain data such as music, photos, contact data, scheduling data, and other files.

The one or more processors 8312 are in communication with a see-through display 8309. The see-through display 8309 may display one or more virtual objects associated with a real-world environment. The one or more processors 8312 also communicates with RF transmitter/receiver 8306 which in turn is coupled to an antenna 8302, with infrared transmitter/receiver 8308, with global positioning service (GPS) receiver 8365, and with movement/orientation sensor 8314 which may include an accelerometer and/or magnetometer. RF transmitter/receiver 8308 may enable wireless communication via various wireless technology standards such as Bluetooth® or the IEEE 802.11 standards. Accelerometers have been incorporated into mobile devices to enable applications such as intelligent user interface applications that let users input commands through gestures, and orientation applications which can automatically change the display from portrait to landscape when the mobile device is rotated. An accelerometer can be provided, e.g., by a micro-electro-mechanical system (MEMS) which is a tiny mechanical device (of micrometer dimensions) built onto a semiconductor chip. Acceleration direction, as well as orientation, vibration, and shock can be sensed. The one or more processors 8312 further communicate with a ringer/vibrator 8316, a user interface keypad/screen 8318, a speaker 8320, a microphone 8322, a camera 8324, a light sensor 8326, and a temperature sensor 8328. The user interface keypad/screen may include a touch-sensitive screen display.

The one or more processors 8312 controls transmission and reception of wireless signals. During a transmission mode, the one or more processors 8312 provide voice signals from microphone 8322, or other data signals, to the RF transmitter/receiver 8306. The transmitter/receiver 8306 transmits the signals through the antenna 8302. The ringer/vibrator 8316 is used to signal an incoming call, text message, calendar reminder, alarm clock reminder, or other notification to the user. During a receiving mode, the RF transmitter/receiver 8306 receives a voice signal or data signal from a remote station through the antenna 8302. A received voice signal is provided to the speaker 8320 while other received data signals are processed appropriately.

Additionally, a physical connector 8388 may be used to connect the mobile device 8300 to an external power source, such as an AC adapter or powered docking station, in order to recharge battery 8304. The physical connector 8388 may also be used as a data connection to an external computing device. The data connection allows for operations such as synchronizing mobile device data with the computing data on another device.

The disclosed technology is operational with numerous other general purpose or special purpose computing system environments or configurations. Examples of well-known computing systems, environments, and/or configurations that may be suitable for use with the technology include, but are not limited to, personal computers, server computers, handheld or laptop devices, multiprocessor systems, microprocessor-based systems, set top boxes, programmable consumer electronics, network PCs, minicomputers, mainframe computers, distributed computing environments that include any of the above systems or devices, and the like.

The disclosed technology may be described in the general context of computer-executable instructions, such as program modules, being executed by a computer. Generally, software and program modules as described herein include routines, programs, objects, components, data structures, and other types of structures that perform particular tasks or implement particular abstract data types. Hardware or combinations of hardware and software may be substituted for software modules as described herein.

The disclosed technology may also be practiced in distributed computing environments where tasks are performed by remote processing devices that are linked through a communications network. In a distributed computing environment, program modules may be located in both local and remote computer storage media including memory storage devices.

For purposes of this document, each process associated with the disclosed technology may be performed continuously and by one or more computing devices. Each step in a process may be performed by the same or different computing devices as those used in other steps, and each step need not necessarily be performed by a single computing device.

For purposes of this document, reference in the specification to "an embodiment," "one embodiment," "some embodiments," or "another embodiment" may be used to described different embodiments and do not necessarily refer to the same embodiment.

For purposes of this document, a connection can be a direct connection or an indirect connection (e.g., via another part).

For purposes of this document, the term "set" of objects, refers to a "set" of one or more of the objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An electronic device for displaying content, comprising:
a see-through display configured to display a virtual content reader to an end user of the electronic device; and
one or more processors configured to cause a first portion of the content to be displayed within a first region of the virtual content reader and cause the first portion of the content to scroll in response to detecting that the end user has viewed at least a subset of the first portion of the content, the one or more processors configured to enable eye tracking of the end user of the electronic device and detect that the end user has gazed at a second region of the virtual content reader different from the first region for at least a first period of time based on the eye tracking, the one or more processors configured to enable head tracking of the end user of the electronic device in response to detecting that the end user of the electronic device has gazed at the second region of the virtual content reader for at least the first period of time and disable scrolling of the first portion of the content in response to detecting that the end user gazed at the second region, the one or more processors configured to detect a selection of a bookmark based on one or more head movements of the end user subsequent to enabling the head tracking of the end user of the electronic device, the bookmark corresponds with a section of the content that the end user focused on for at least a particular period of time, the one or more processors configured to cause a second portion of the content corresponding with the section of the content to be displayed in response to detecting the selection of the bookmark and cause the second portion of the content to scroll in response to detecting that the end user has viewed at least a subset of the second portion of the content.

2. The electronic device of claim 1, wherein:
the electronic device comprises a head-mounted display device; and
the at least a particular period of time comprises the longest period of time over all sections of the content.

3. The electronic device of claim 1, wherein:
the first region of the virtual content reader corresponds with a midsection of the virtual content reader.

4. The electronic device of claim 1, wherein:
the one or more processors configured to detect an ambient lighting condition and determine a dimming factor for the see-through display based on the ambient lighting condition, the one or more processors configured to adjust a degree of transparency of the see-through display based on the dimming factor.

5. The electronic device of claim 4, wherein:
the see-through display includes an electrochromic material; and
the section of the content corresponds with an image.

6. The electronic device of claim 1, wherein:
the one or more processors configured to detect an ambient lighting condition and determine a font size for the first portion of the content based on the ambient lighting condition, the one or more processors configured to cause the first portion of the content to be displayed from the virtual content reader using the font size.

7. The electronic device of claim 1, wherein:
the one or more processors configured to detect an ambient lighting condition and determine a contrast coloring for the first portion of the content based on the ambient lighting condition, the one or more processors configured to cause the first portion of the content to be displayed from the virtual content reader using the contrast coloring.

8. A method, comprising:
generating an augmented reality environment using a head-mounted display device, the augmented reality environment includes a virtual content reader;
acquiring content using the head-mounted display device;
displaying a first portion of the content within a first region of the virtual content reader;
scrolling the first portion of the content in response to detecting that an end user of the head-mounted display device has viewed at least a subset of the first portion of the content;
enabling eye tracking of the end user of the head-mounted display device;

detecting that the end user of the head-mounted display device has gazed at a second region of the virtual content reader different from the first region for at least a first period of time based on the eye tracking of the end user of the head-mounted display device;

enabling head tracking of the end user of the head-mounted display device in response to detecting that the end user of the head-mounted display device has gazed at the second region of the virtual content reader for at least the first period of time;

disabling the scrolling the first portion of the content in response to detecting that the end user of the head-mounted display device has gazed at the second region of the virtual content reader for at least the first period of time;

generating a bookmark corresponding with a section of the content that the end user focused on for the longest period of time over all sections of the content;

detecting a selection of the bookmark based on one or more head movements of the end user of the head-mounted display device subsequent to enabling the head tracking of the end user of the head-mounted display device;

displaying a second portion of the content corresponding with the section of the content in response to detecting the selection of the bookmark; and scrolling the second portion of the content in response to detecting that the end user of the head-mounted display device has viewed at least a subset of the second portion of the content.

9. The method of claim 8, wherein:
the section of the content corresponds with an image; and
the first period of time comprises two seconds.

10. The method of claim 8, wherein:
the second portion of the content includes a sentence.

11. The method of claim 8, wherein:
the scrolling the first portion of the content includes displaying the virtual content reader to the end user of the head-mounted display device and scrolling the first portion of the content displayed on the virtual content reader.

12. The method of claim 8, wherein:
the scrolling the first portion of the content includes displaying the virtual content reader to the end user of the head-mounted display device; and
the first region corresponds with a midsection of the virtual content reader.

13. The method of claim 8, further comprising:
detecting an ambient lighting condition;
determining a dimming factor for a see-through display of the head-mounted display device based on the ambient lighting condition; and
adjusting a degree of transparency of the see-through display based on the dimming factor.

14. The method of claim 13, wherein:
the see-through display includes an electrochromic material.

15. The method of claim 8, further comprising:
detecting an ambient lighting condition;
determining a font size for the first portion of the content based on the ambient lighting condition; and
determining a contrast coloring for the first portion of the content based on the ambient lighting condition, the scrolling the first portion of the content includes displaying the first portion of the content using the font size and the contrast coloring.

16. The method of claim 15, further comprising:
determining a distance of a virtual content reader from the head-mounted display device, the scrolling the first portion of the content includes displaying the virtual content reader to the end user of the head-mounted display device, the determining a font size includes determining the font size based on the distance and the ambient lighting condition.

17. The method of claim 8, further comprising:
converting the content into formatted content such that the formatted content represents the content in a single column format, the scrolling the first portion of the content includes scrolling the first portion of the content in the single column format.

18. The method of claim 8, further comprising:
acquiring a set of bookmarks associated with the content; and
displaying a first bookmark of the set of bookmarks, the first bookmark is associated with a paragraph of the content read by the end user of the head-mounted display device.

19. One or more storage devices containing processor readable code for programming one or more processors to perform a method for displaying content using a head-mounted display device comprising the steps of:

displaying a virtual content reader to the end user of the head-mounted display device;

displaying a first portion of the content within a first region of the virtual content reader;

scrolling the first portion of the content in response to detecting that the end user has viewed at least a subset of the first portion of the content;

enabling eye tracking of the end user of the head-mounted display device;

detecting that the end user of the head-mounted display device has gazed at a second region of the virtual content reader different from the first region for at least a first period of time based on the eye tracking of the end user of the head-mounted display device;

enabling head tracking of the end user of the head-mounted display device in response to detecting that the end user of the head-mounted display device has gazed at the second region of the virtual content reader for at least the first period of time;

disabling the scrolling the first portion of the content in response to detecting that the end user of the head-mounted display device has gazed at the second region of the virtual content reader for at least the first period of time;

detecting a selection of a bookmark based on one or more head movements of the end user of the head-mounted display device subsequent to enabling the head tracking of the end user of the head-mounted display device, the bookmark corresponds with a section of the content that the end user focused on for the longest period of time over all sections of the content;

displaying a second portion of the content corresponding with the section of the content in response to detecting the selection of the bookmark; and scrolling the second portion of the content in response to detecting that the end user of the head-mounted display device has viewed at least a subset of the second portion of the content.

20. The one or more storage devices of claim 19, further comprising:
- detecting an ambient lighting condition;
- determining a dimming factor for a see-through display of the head-mounted display device based on the ambient lighting condition; and
- adjusting a degree of transparency of the see-through display based on the dimming factor.

\* \* \* \* \*